(12) United States Patent
Marchese

(10) Patent No.: US 10,525,872 B2
(45) Date of Patent: Jan. 7, 2020

(54) SYSTEM, METHOD AND APPARATUS FOR MOUNTING ACCESSORIES TO A VEHICLE

(71) Applicant: ZRoadz LED, Inc., Corona, CA (US)

(72) Inventor: Daniel S Marchese, Rancho Santa Margarita, CA (US)

(73) Assignee: ZROADZ LED, INC., Corona, CA (US)

( * ) Notice: Subject to any disclaimer, the term of this patent is extended or adjusted under 35 U.S.C. 154(b) by 642 days.

(21) Appl. No.: 14/930,575

(22) Filed: Nov. 2, 2015

(65) Prior Publication Data
US 2017/0120805 A1    May 4, 2017

(51) Int. Cl.
| | |
|---|---|
| *B60Q 1/02* | (2006.01) |
| *B60Q 1/26* | (2006.01) |
| *B60Q 1/24* | (2006.01) |
| *F21V 3/02* | (2006.01) |
| *F21Y 115/10* | (2016.01) |

(52) U.S. Cl.
CPC .............. *B60Q 1/2611* (2013.01); *B60Q 1/24* (2013.01); *B60Q 1/2696* (2013.01); *F21V 3/02* (2013.01); *F21Y 2115/10* (2016.08)

(58) Field of Classification Search
CPC ...... B60Q 1/2611; B60Q 1/24; B60Q 1/2696; F21V 3/02
See application file for complete search history.

(56) References Cited

U.S. PATENT DOCUMENTS

| | | | | |
|---|---|---|---|---|
| 4,722,030 | A * | 1/1988 | Bowden | B60Q 1/2611 362/233 |
| 5,171,083 | A * | 12/1992 | Rich | B60Q 1/2611 362/418 |
| 5,481,441 | A * | 1/1996 | Stevens | B60Q 1/24 362/232 |
| 6,114,954 | A * | 9/2000 | Palett | B60R 9/00 224/321 |
| 6,337,623 | B1 * | 1/2002 | Krugh, IV | B60Q 1/2611 340/433 |
| 6,682,210 | B1 * | 1/2004 | Ford | B60Q 1/2611 362/238 |
| 6,986,593 | B2 | 1/2006 | Rhoads | |
| D713,574 | S | 9/2014 | Adams | |
| 8,979,303 | B2 | 3/2015 | Adams | |
| 9,409,528 | B1 * | 8/2016 | Datz | B60Q 1/2611 |
| 9,428,099 | B1 * | 8/2016 | Doenges | B60Q 1/2611 |

(Continued)

*Primary Examiner* — Anabel Ton
(74) *Attorney, Agent, or Firm* — Orrick, Herrington & Sutcliffe LLP

(57) ABSTRACT

A system for mounting a light to a vehicle and methods for making and using same is disclosed herein. The system allows for a mounting assembly to be coupled to a front, a rear, or both the front and the rear of the roof of a vehicle. Lights can be mounting via light mounting brackets at various angles using a plurality of detents. The mounting assembly includes hollowed mounting fasteners for routing a light cable through the mounting fastener thereby requiring fewer holes through the roof of the vehicle to prevent water intrusion into the vehicle. The mounting fastener can be covered by a boot for preventing water intrusion into the vehicle. The mounting assembly advantageously can include a diffuser for reducing noise and vibration levels resulting from the coupling between the mounting assembly and the vehicle.

5 Claims, 26 Drawing Sheets

(56) References Cited

U.S. PATENT DOCUMENTS

| | | | |
|---|---|---|---|
| 9,499,095 B1* | 11/2016 | Buehler | B60Q 1/46 |
| 2002/0036908 A1* | 3/2002 | Pederson | B60Q 1/2611 |
| | | | 362/545 |
| 2007/0217212 A1* | 9/2007 | Klinkman | B60Q 1/24 |
| | | | 362/493 |
| 2013/0077336 A1* | 3/2013 | Helterbrand | B60Q 1/2611 |
| | | | 362/541 |
| 2014/0078762 A1* | 3/2014 | Adams | F21V 21/30 |
| | | | 362/496 |
| 2016/0071183 A1 | 3/2016 | Joshi et al. | |
| 2016/0258598 A1 | 9/2016 | Adams | |

* cited by examiner

400

```
405: Disposing a mounting bar for coupling with the vehicle at least partially into an opening formed in a bracket for coupling with the light, wherein a first detent associated with the mounting bar cooperates with a second detent of the mounting bracket.

410: Coupling a vehicle mount to an end region of the mounting bar.

415: Coupling a vehicle mount to the vehicle using a mounting fastener, wherein the mounting fastener defines a hollow passage for routing a cable of the light.

420: Encasing the mounting fastener in a protective boot.

425: Routing a cable of the light through a hollow passage formed in the mounting bar.

430: Coupling a diffuser on the light
```

Forming a bracket for coupling with a light
505

↓

Defining an opening for receiving a mounting bar for coupling with a vehicle; and
510

↓

Forming the bracket with a first detent for cooperating with a second detent of the mounting bracket.
515

↓

Forming a vehicle mount for coupling to an end region of the mounting bar.
520

↓

Forming a mounting fastener defining a hollow passage for routing a cable of the light.
525

↓

Forming a boot for encasing the mounting fastener.
530

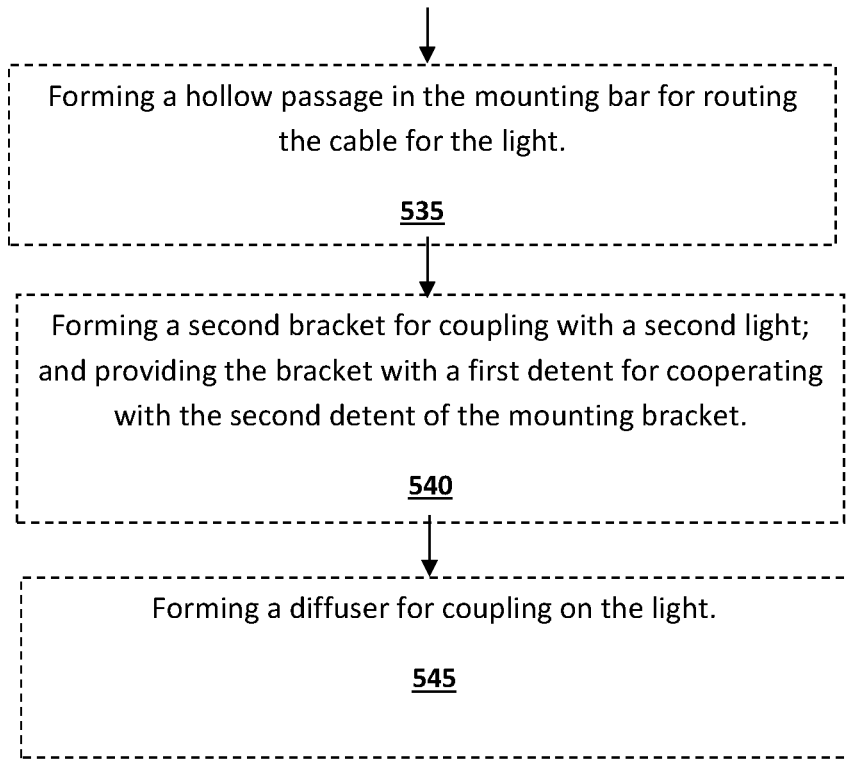

SYSTEM, METHOD AND APPARATUS FOR MOUNTING ACCESSORIES TO A VEHICLE

FIELD

The disclosed embodiments described herein relate generally to vehicle accessories and more particularly but not exclusively, to vehicle light systems.

BACKGROUND

Truck and Sport Utility Vehicle (SUV) owners often desire to mount one or more lights and other accessories to the roof of the vehicle. These lights, for example, can be used to illuminate the area in front of the vehicle, the area behind the vehicle, or the bed of the vehicle. Often the owner desires these lights to be mounted at varying orientations to illuminate multiple areas simultaneously. One of the problems faced with the installation of lights to the front of the vehicle is matching the contour of the mount to the curvature of the roof in order to have a flush, stable mounting to prevent vibration and water intrusion. Another problem with mounting lights to the roof of a vehicle is the need to drill holes through the roof for the electrical wiring for the lights in addition to the mounting holes for the mounting brackets. These additions holes present the opportunity for water intrusion into the passenger cabin of the vehicle. Finally, aftermarket vehicle lighting mounts can present noise and/or vibration issues that need to be considered and eliminated.

In view of the foregoing, there is a need for mounting vehicle accessories that overcome the problems set forth above.

BRIEF DESCRIPTION OF THE DRAWINGS

FIG. 21 is an exemplary flow diagram illustrating an embodiment of the method for mounting a light to a vehicle.

FIG. 22A is a beginning of an exemplary flow diagram illustrating a method for manufacturing a vehicle light mounting assembly.

FIG. 22B is an end of an exemplary flow diagram illustrating an embodiment of the method for manufacturing a vehicle light mounting assembly of FIG. 22A.

FIG. 22 is a compilation of FIG. 22A and FIG. 22B.

Figure 1:
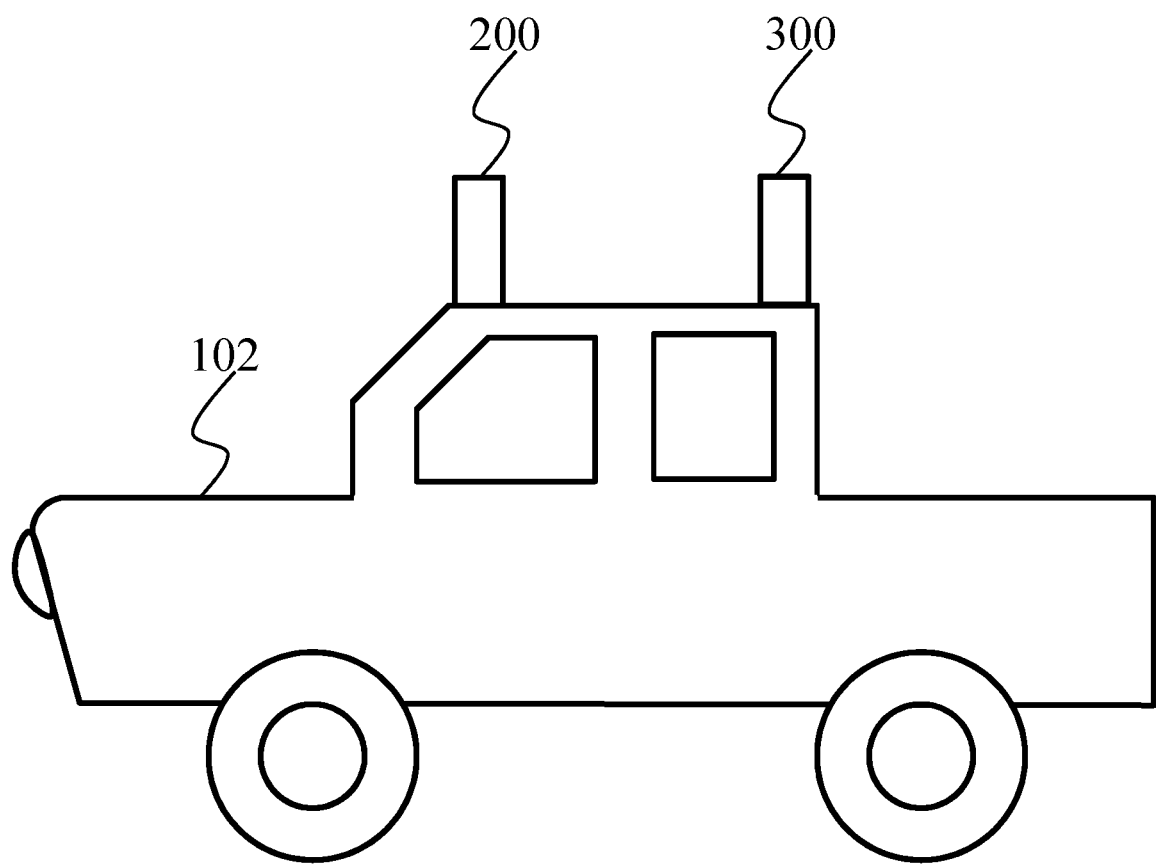
FIG. 1 is an exemplary diagram of an embodiment of a system for mounting a light on a vehicle.

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

DETAILED DESCRIPTION OF THE PREFERRED EMBODIMENTS

Since currently available light mounting systems do not allow mounting a variety of different lights to a vehicle, a system and method for mounting a light to vehicle that allows mounting the light a various angles, minimizes the number of holes through the vehicle roof required, minimizes the problem of water intrusion into the passenger compartment, and addresses the problem of vibration and noise due to airflow around the mount is highly desirable. This result can be achieved, according to at least the embodiments disclosed herein, by a system 100 for mounting a light as illustrated in FIG. 1.

Turning to FIG. 1, the system 100 for mounting a light on a vehicle 102 is shown. The vehicle 102 can include any conventional type of passenger vehicle, including a truck or sports utility vehicle. The system 100 can comprise several components. As illustrated in FIG. 1, the system 100 can include a front mounting assembly 200 and/or a rear mounting assembly 300. The front mounting assembly 200 can be mounted in the roof gutter (not shown) of a vehicle 102. In some embodiments, the system 100 can comprise one of the front mounting assembly 200 and the rear mounting assembly 300. In some embodiments, the system 100 can comprise of both the front mounting assembly 200 and the rear mounting assembly 300. Both the front mounting assembly 200 and the rear mounting assembly 300 allow for multiple configurations for mounting various accessories on a vehicle 102. An exemplary accessory can include an external light. The light can employ incandescent light bulbs, fluorescent light bulbs, and/or light emitting diode (LED) light bulbs. The light can include multiple configurations from single light bulb lights to multiple light bulbs. The multiple light bulbs can be disposed in any predetermined configuration, including, for example, one or more rows of lights disposed within a single housing. Another type of accessory can include a mount for video camera such as a GoPro camera. Other types of accessories include air horns and flag mounts. Some advantages of the system 100 disclosed include providing a secure mounting for various accessories on a vehicle, minimizing the number of mounting holes that need to made in the roof of a vehicle, minimizing the opportunity for water intrusion into the passenger compartment of the vehicle, and providing a mount capable of multiple configurations to meet the needs of a vehicle owner.

Figure 2:
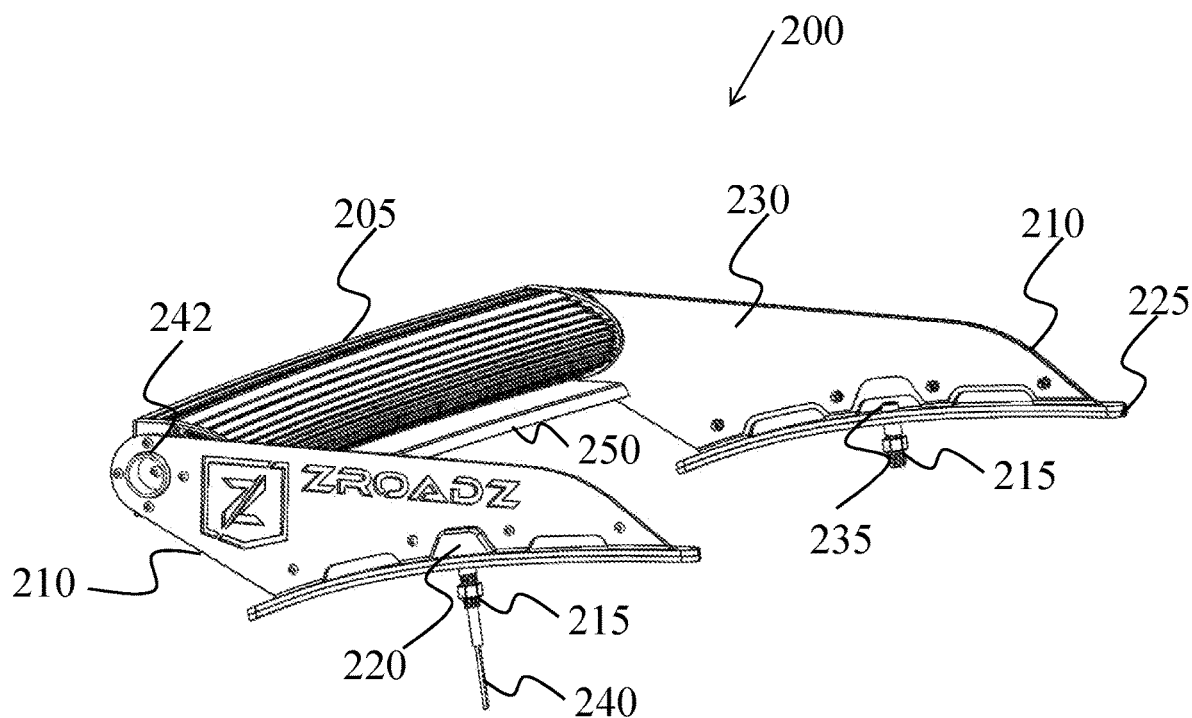
FIG. 2 is an exemplary drawing illustrating an embodiment of the front light assembly of FIG. 1.

FIG. 2 illustrates an embodiment of a front light bar assembly 200 for mounting a light bar 205. As shown in FIG. 2, the front light bar assembly 200 can comprise a light bar 205, a vehicle mounting bracket 210, a mounting fastener 215, and a protective boot 220. The vehicle mounting bracket 210 can have a pre-set shape, which as illustrated, can be generally triangular in shape including a mounting flange 225 coupled at a base of the bracket 210. In some embodiments, the mounting flange 225 can preferably be curved for matching the curvature of a roof of a selected vehicle 102, as shown in FIG. 1. The mounting flange 225 can further be configured to be disposed within a roof gutter (not shown), of a selected vehicle 102 by forming the mounting flange 225 at a predetermined width to fit within the confines of the roof gutter 104. The roof gutter is a preferable location for coupling the mounting flange 225 to the selected vehicle 102 because of an overlap of structural layers between the roof and door components of the vehicle 102 in the roof gutter region.

The mounting flange 225 can be formed together with a body 230 of the vehicle mounting bracket 210 and/or formed separately from the vehicle mounting bracket 210. If separate, the mounting flange 225 can be coupled with the vehicle mounting bracket 210 in any conventional manner. The vehicle mounting bracket 210 can have a recess 235 through the curved mounting flange 225 to dispose a mounting fastener 215 through the recess 235. A fastener is a hardware device that mechanically joins or affixes two or more objects together. Fasteners as used in this application can include but are not limited to bolts, clasps, screws, pins, rivets, threaded rods, and threaded inserts. In some embodiments, the mounting fastener 215 can be formed as part of the curved mounting flange 225. In other embodiments, the mounting fastener 215 can be formed separately from the curved mounting flange 225 and coupled with the curved mounting flange 225 in any number of conventional ways. For example, one or more mounting fasteners 215 can be used to couple the vehicle mounting bracket 210 to the roof.

In some embodiments, a weather-resistant boot 220 can disposed on the mounting fastener 215. The boot 220 can be composed of any of various weather-resistant materials. In some embodiments, the boot 200 can be formed into a trapezoidal shape with a cylindrical extension protruding from a top region of the trapezoid. A recess can be formed in the center of a mounting surface of the boot 200 to receive a cylindrical extension of the mounting fastener. The recess extends through the boot 200 and through the cylindrical extension forming a passage for receiving a lighting cable 240 through the mounting fastener 215. The cylindrical extension and the boot 220 can provide protection from water intrusion into the recess 235 of the mounting fastener 215 and into a passenger compartment of the vehicle.

A recess 242 can be formed in the body 230 of the vehicle mounting bracket 210 for receiving a light bar 205. The recess 242 can be formed as part of the vehicle mounting bracket 210 and/or formed separately and coupled to the body of the vehicle mounting bracket 210 in any conventional manner. In some embodiments, the recess 242 can be formed to receive a circular protrusion 245 (shown in FIG. 4) from a light bar 205, allowing the light bar 205 to rotate within the recess 242. The light bar 205 can be coupled to the vehicle mounting bracket 210 in any conventional manner including but not limited to fasteners.

In some embodiments the light bar 205 can comprise any conventional type of light bar including a straight light bar. In other embodiments, the light bar 205 can comprise a curved light bar 245. In some embodiments spacers can be used to accommodate the various widths of different light bars 205.

Figure 3:
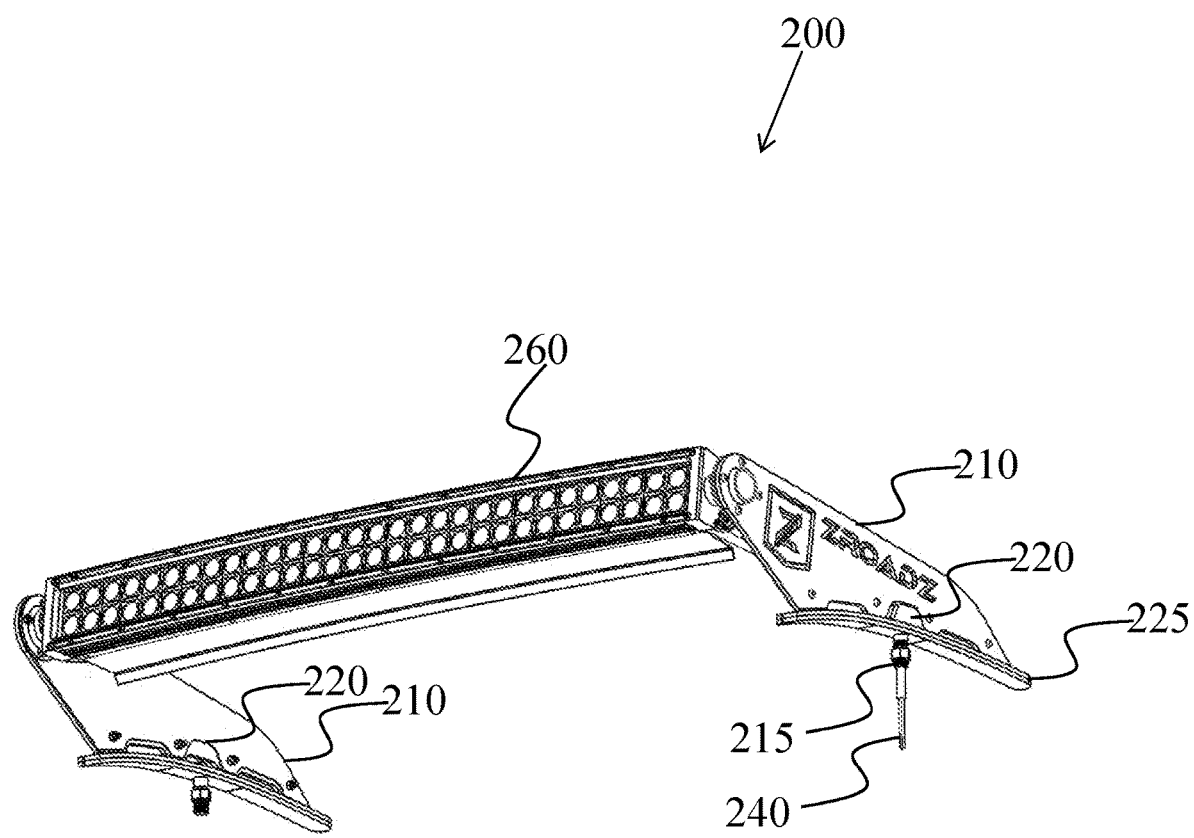
FIG. 3 is an exemplary drawing illustrating an embodiment of the front light assembly of FIG. 2, wherein that front light assembly has a curved light bar installed.

FIG. 3 illustrates a curved light bar 260 mounted in the front light bar assembly 200. In some embodiments, the curved light bar 260 can be coupled to the vehicle mounting bracket 210 in the same manner as the straight light bar 205. The curved light bar 260 configuration share many of the same components as the straight light bar configuration including the vehicle mounting bracket 210, the mounting flange 225 associated with each mounting bracket 210, the boot 220, and the mounting fastener 215.

Figure 4:
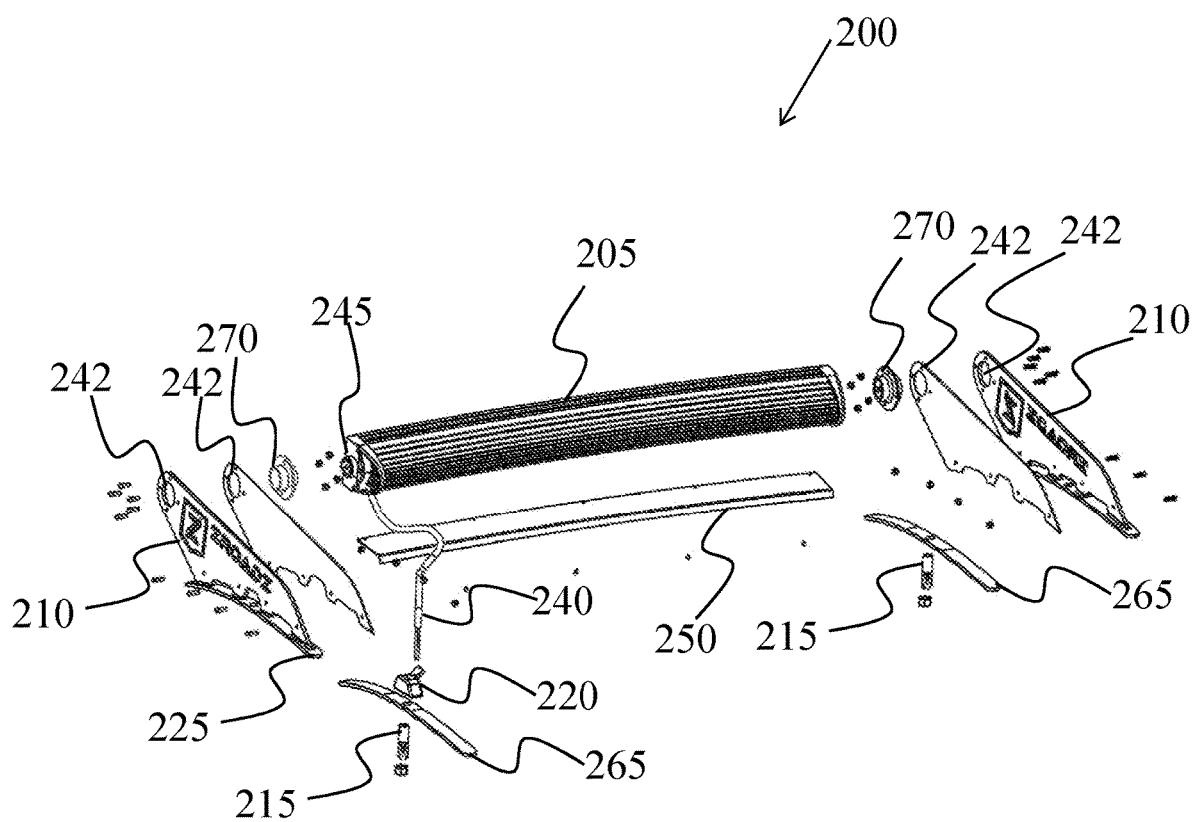
FIG. 4 is an exemplary detailed drawing illustrating an exploded view of one embodiment of the front mounting assembly of FIG. 2.

FIG. 4 is an exploded view of an exemplary front light bar assembly 200 of FIG. 2. FIG. 4 illustrates selected components of the front vehicle mount assembly 200, including a set of brackets 210 for opposite end regions of a bar 205, a light bar 205, a mounting fastener 215, and a boot 220. The front mounting system 200 can optionally include the diffuser 250 and a mounting gasket 265. The mounting gasket 265 provides additional protection from water intrusion into the passenger compartment of the vehicle 102. Other sealants may be utilized in addition to or as a replacement for the mounting gasket 265.

Figure 5:
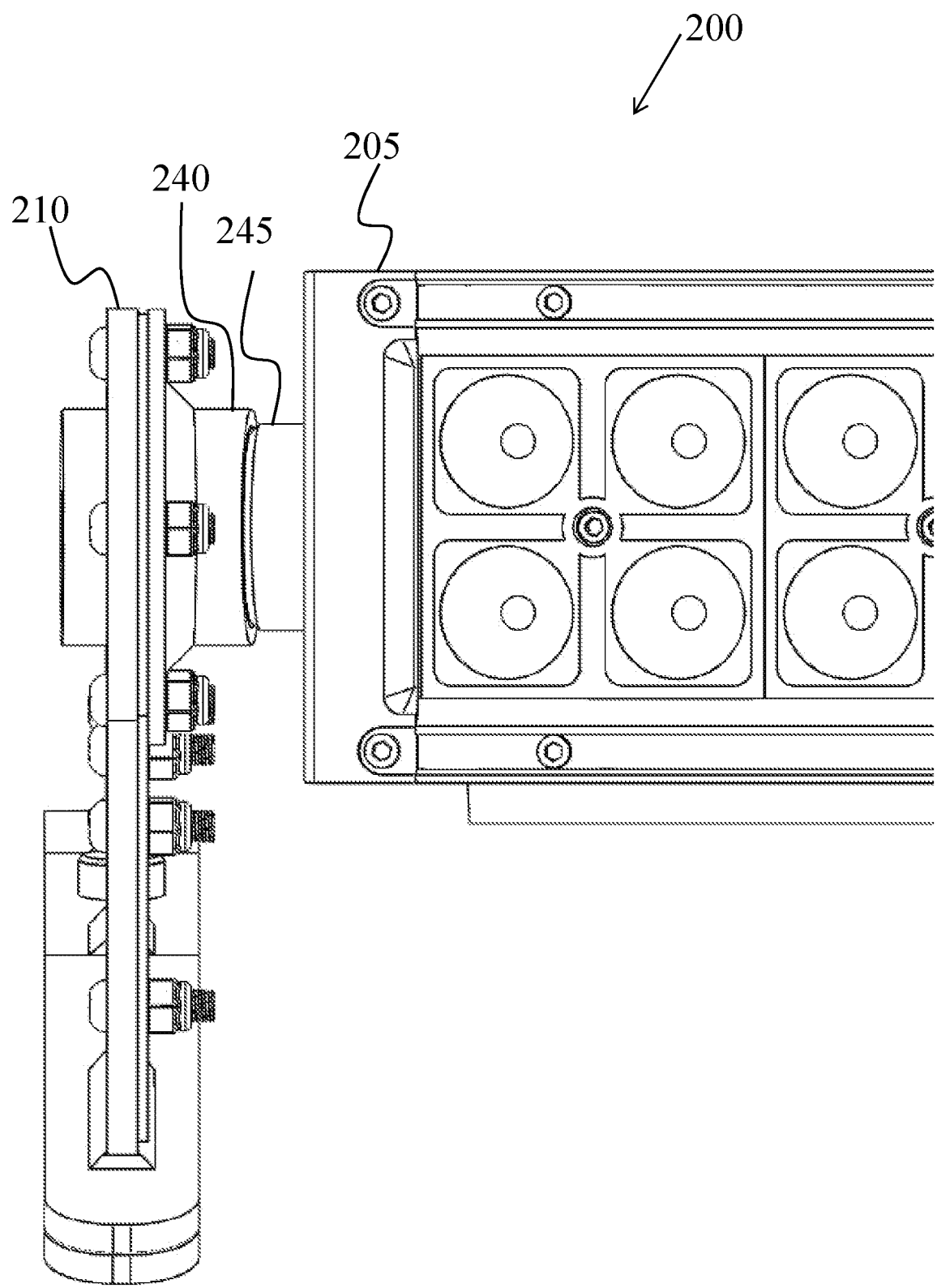
FIG. 5 is an exemplary detailed drawing illustrating an alternative embodiment of the front light assembly of FIG. 2.

FIG. 5 is a detailed view of an exemplary front light bar assembly 200 with a light bar 205 installed. In FIG. 5, a protrusion 245 front an end region of the light bar 205 is coupled with the recess 242 formed in the vehicle mounting bracket 210. In some embodiments the protrusion 245 is circular. FIG. 5 illustrates a detailed front, side view of an embodiment of the front light assembly 200. FIG. 5 depicts the detailed view of the recess 242 formed in the body 230 of the vehicle mounting bracket 210 for receiving a light bar 205. In the manner set forth above, the recess 242 can be formed as part of the vehicle mounting bracket 210 and/or formed separately and coupled to the body of the vehicle mount tin any conventional manner. In some embodiments, the recess 242 can be formed to receive the protrusion 245 extending from a light bar that allows the light 205 to rotate within the recess 242. The light bar 205 can be coupled to the vehicle mount in any conventional manner. In some embodiments, the light bar 205 can be coupled to the vehicle mount using two fasteners, one fastener at each of a proximal and a distal end region of the light bar 205. In some embodiments, more than one fastener can be used at one or both the proximal and distal end region to fix the angle that the light bar 205 is mounted with respect to the roof of the vehicle 102.

Figure 6:
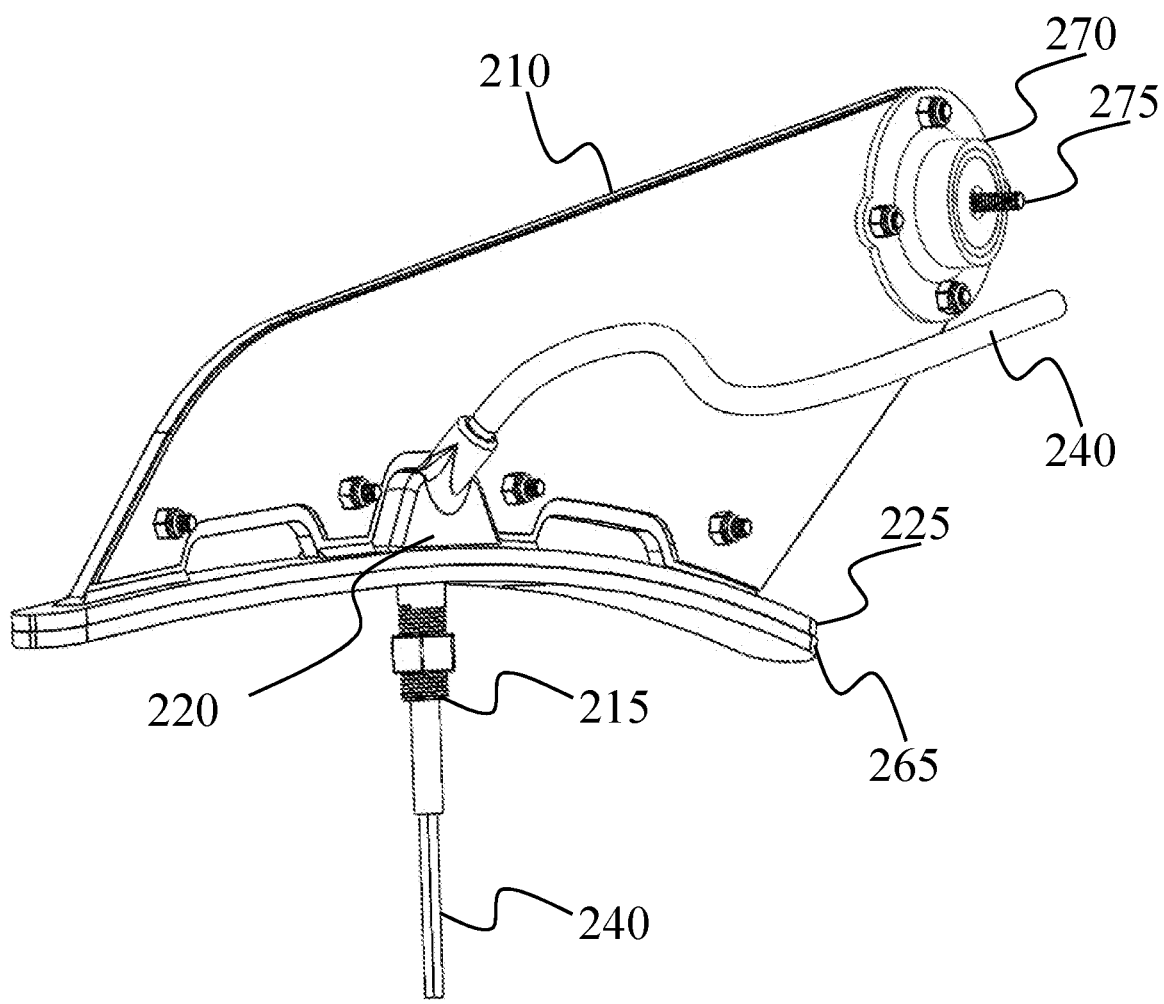
FIG. 6 is an exemplary detailed drawing illustrating an alternative embodiment of the front light bar assembly of FIG. 5, wherein the light bar is removed from the front light bar assembly.

FIG. 6 illustrates a stand-alone view of one embodiment of the vehicle mounting bracket 210. The front light bar assembly 200 can be constructed of any suitable material such as a metal. The metal can comprise stainless steel. In some embodiments, the metal can be powder coated to reduce corrosion. The body 230 of the vehicle mounting bracket 210 can have any number of cable fasteners (not shown) affixed to the body 230 to secure the light cable 240 to the vehicle mounting bracket 210. FIG. 6 provides a close-up view of the boot 220. FIG. 6 also illustrates an exemplary of routing of the light cable 240 through the boot 220 and the mounting fastener 215. As illustrated in FIG. 6, a light bar mount 270 is coupled with the vehicle mounting bracket 210 via a recess 242 formed in the body 230 of the vehicle mounting bracket 210. A plurality of fasteners can be used to couple the light bar mount 270 to the vehicle mounting bracket 210. Although only one fastener 275 is depicted in FIG. 6, a plurality of fasteners can be used for coupling the light bar 205 to the vehicle mounting bracket 210.

Figure 7:
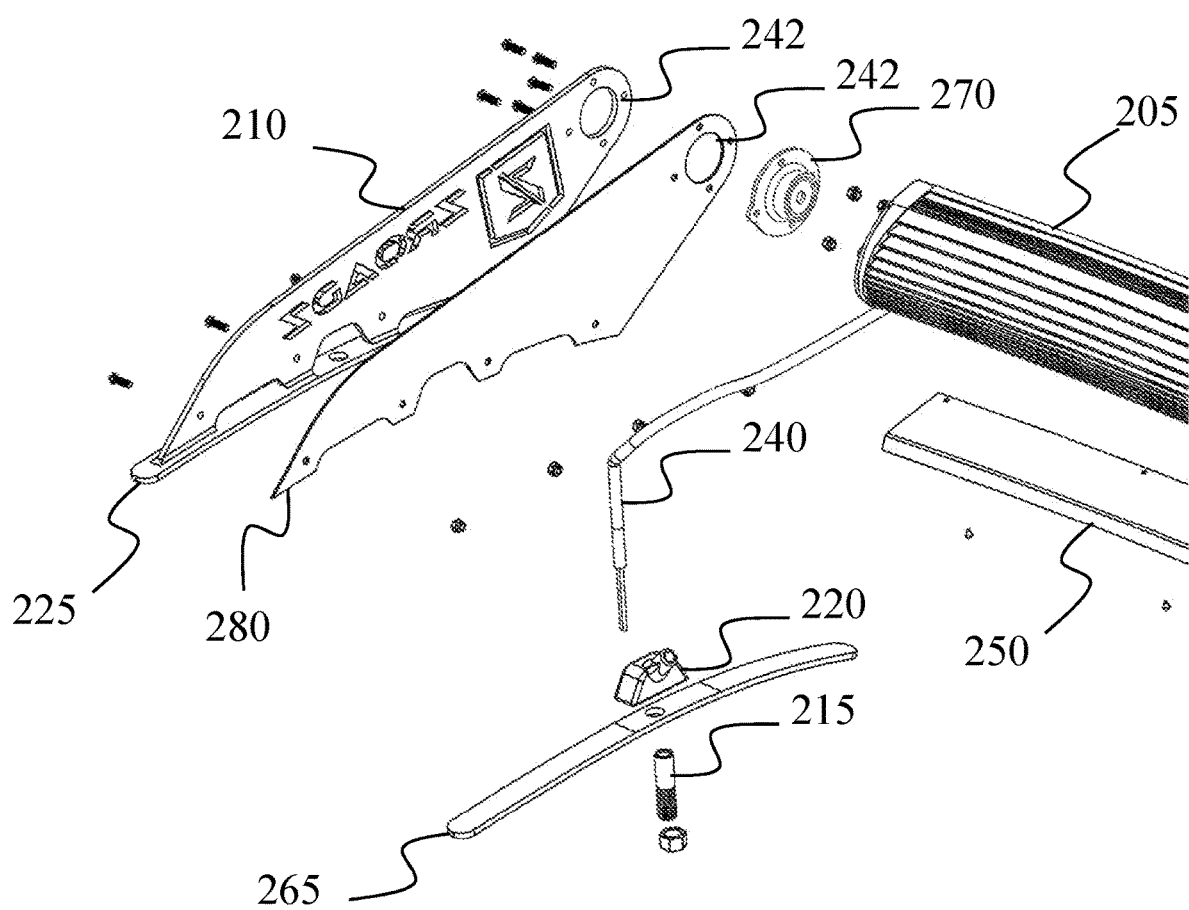
FIG. 7 is an exemplary detailed drawing another alternative embodiment of the front light bar assembly of FIG. 5, wherein a power cable of the light bar is received by a mounting fastener.

FIG. 7 illustrates a detailed exploded view of the front mounting assembly 200. As shown in FIG. 7, the vehicle mounting bracket 210 can include a backplate 280. The backplate 280 can be coupled with the vehicle mounting bracket 210 via a plurality of fasteners to increase the stiffness of the vehicle mounting bracket 210. FIG. 7 also illustrates the relationship among the selected components of the front mounting assembly such as the light bar 205, vehicle mounting bracket 210, the boot 220, the light cable 240, the mounting fastener 215, and the mounting flange 225.

Figure 8:
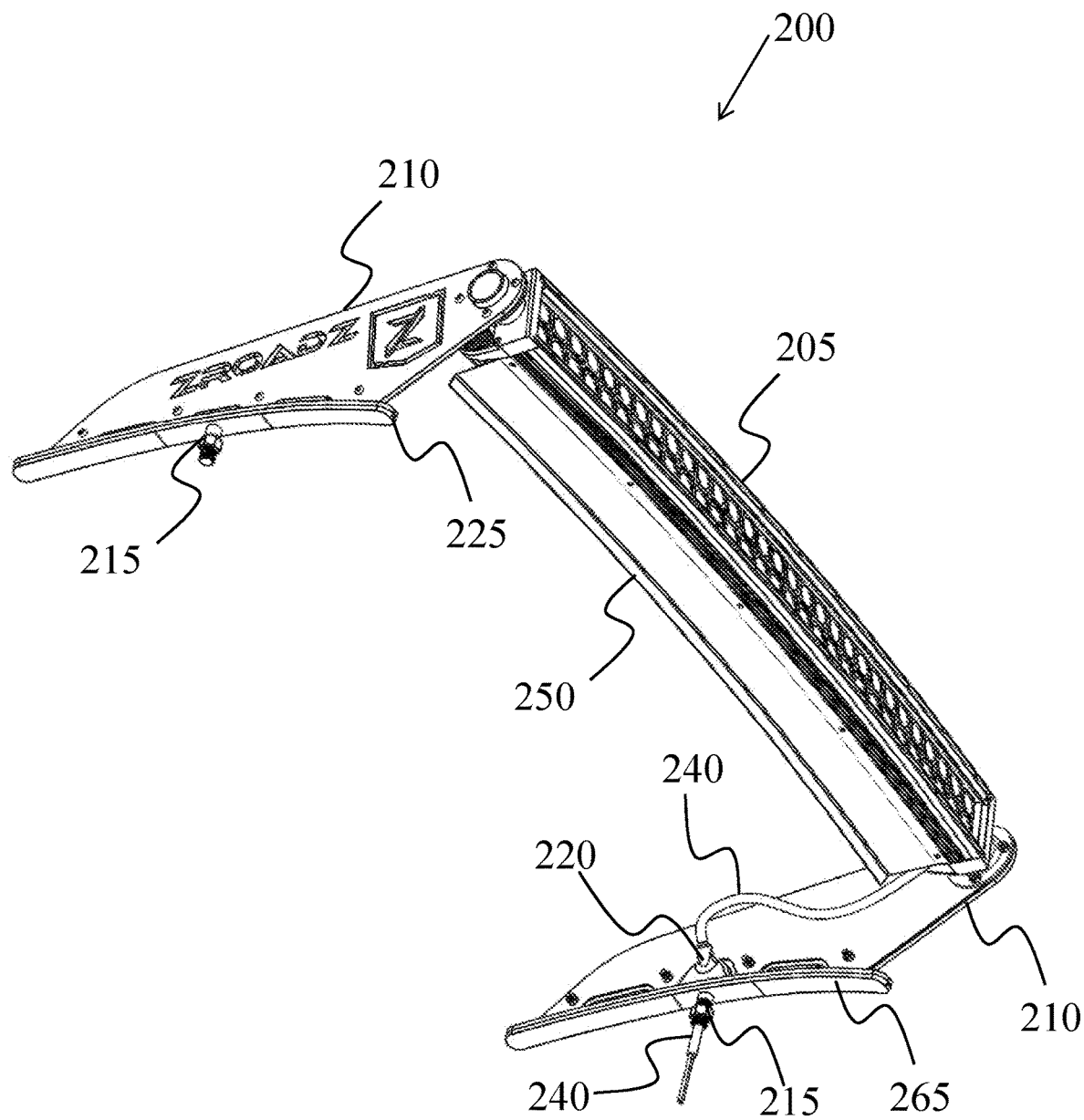
FIG. 8 is an exemplary drawing illustrating an embodiment of a diffuser for the front light bar assembly.

FIG. 8 illustrates a bottom view of the front mounting assembly 200 with the diffuser 250 installed. In some embodiments, a diffuser 250 is coupled to a housing 255 of the light bar 205 with a plurality of fasteners.

Figure 9A:
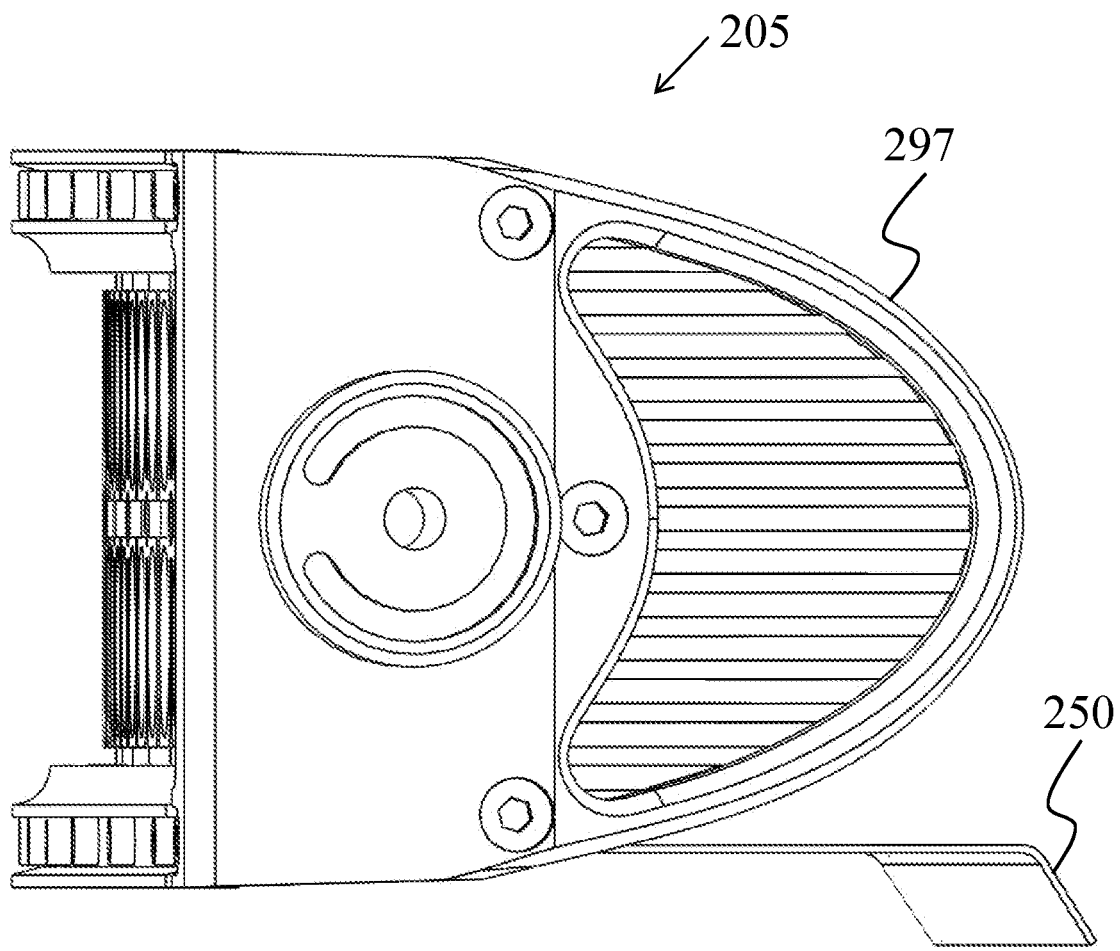
FIG. 9A is an exemplary drawing illustrating an embodiment of the diffuser of FIG. 8, wherein the diffuser is installed on the front light bar assembly.

FIG. 9A illustrates a side view of the light bar 205 with the diffuser 250 installed. FIG. 9A shows one embodiment of the diffuser with a selected angle of 60 degrees for the trailing edge of the diffuser.

Figure 9B:
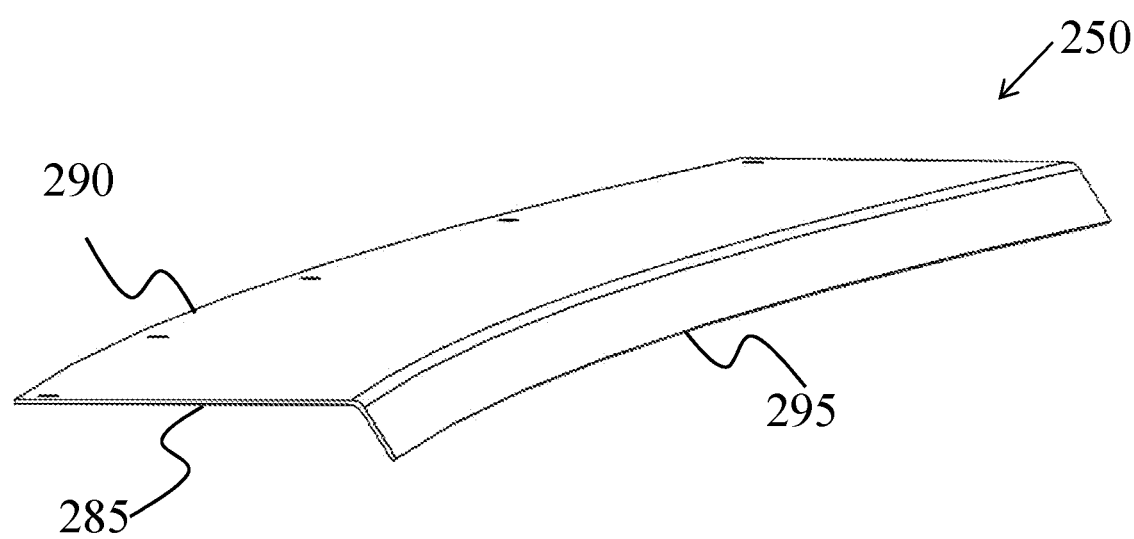
FIG. 9B is an exemplary drawing illustrating an embodiment of the diffuser of FIG. 8, wherein the diffuser is not installed.

FIG. 9B illustrates a stand-alone view of the diffuser 250. A diffuser can disrupt the airflow around the light bar 205 (shown in FIG. 9A) to reduce vibration and/or noise that can be created by the light bar 205 being exposed to the laminar airflow around over the windshield and roof of the vehicle. As shown in FIG. 9B, the diffuser 250 comprises a planar member 285 including a leading edge region 290 and a trailing edge region 295. The planar member 285 can coupled to the housing 297 of the light bar 205. The trailing edge 295 of the plate 285 is bent downward away from the housing 297 (shown in FIG. 9A) at an angle between 15 and 90 degrees. In some embodiments, the angle can be 60 degrees. The diffuser 250 can be manufactured from a rolled metal such as stainless steel. In other embodiments, the diffuser 250 can be fabricated from other materials such as carbon fiber, plastics, fiberglass, or ceramic material. The diffuser central member 285 for the curved light bar is formed with a curvature to conform to a radius of the curved light bar. Although shown in FIG. 9B as part of the curved light bar, the diffuser 250 can optionally be added to the straight light bar assembly.

Figure 10:
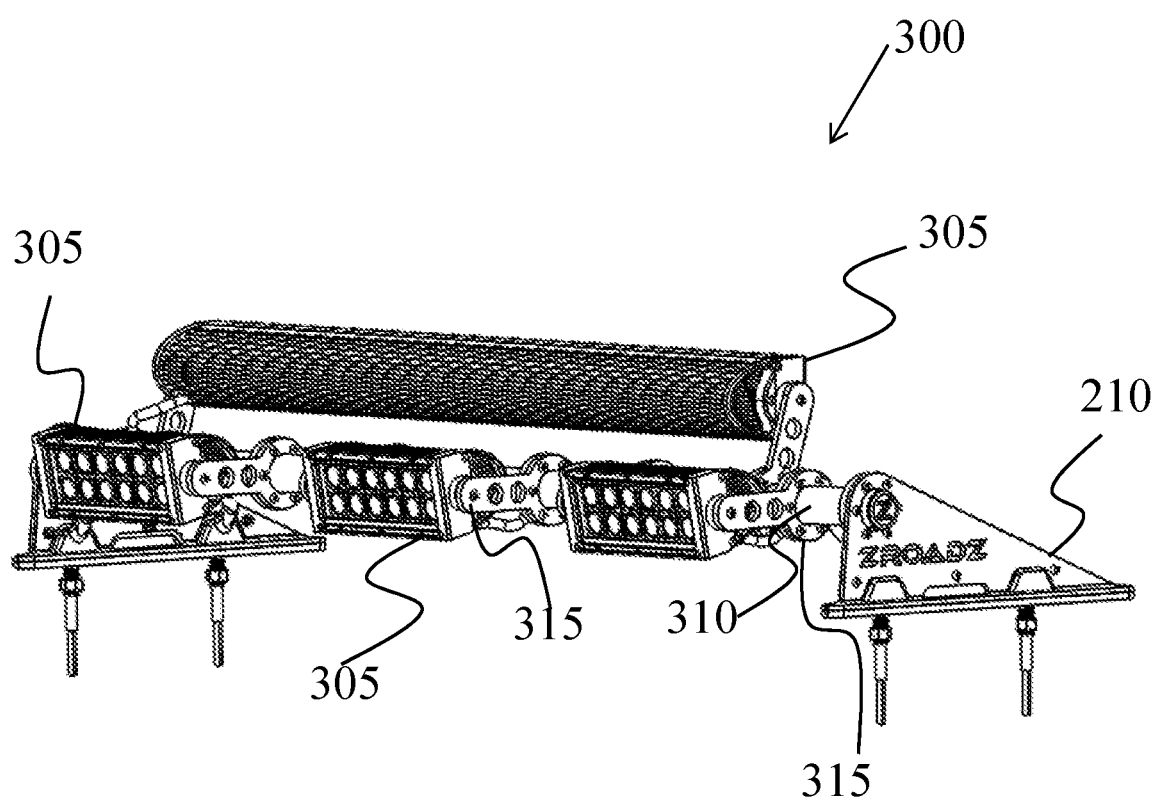
FIG. 10 is an exemplary drawing illustrating an embodiment of rear light mounting assembly of FIG. 1.

FIG. 10 illustrates a view of a rear light mounting assembly 300 configured with four lights 305. In some embodiments, four lights can be installed on a mounting bar 310. Each light 305 can be coupled with the mounting bar 310 via a plurality of light bar brackets 315. The light 305 can be coupled to the distal end region of the light bar bracket 315 using a fastener. The proximal end region of the light bar bracket 315 is coupled with the mounting bar 310. In some embodiments, recessed fasteners can be used to secure the light bar bracket 315 to the mounting bar 310. Each light bar bracket 315 can extend from the bar 310 at any one of selected angles with respect to the roof of a vehicle 102 through the use of multiple detents 320.

The term "detents" refers to any combination of mating elements, such as blocks, tabs, pockets, slots, ramps, locking pins, cantilevered members, support pins, and the like, that may be selectively or automatically engaged and/or disengaged to couple or decouple a bracket with a mounting bar relative to one another. It will be appreciated that the detents as illustrated and described below are merely exemplary and not exhaustive. For example, the cooperating detents can include a first set of cooperating blocks and pockets for releasable coupling the bracket 315 and the mounting bar 310.

Figure 15:
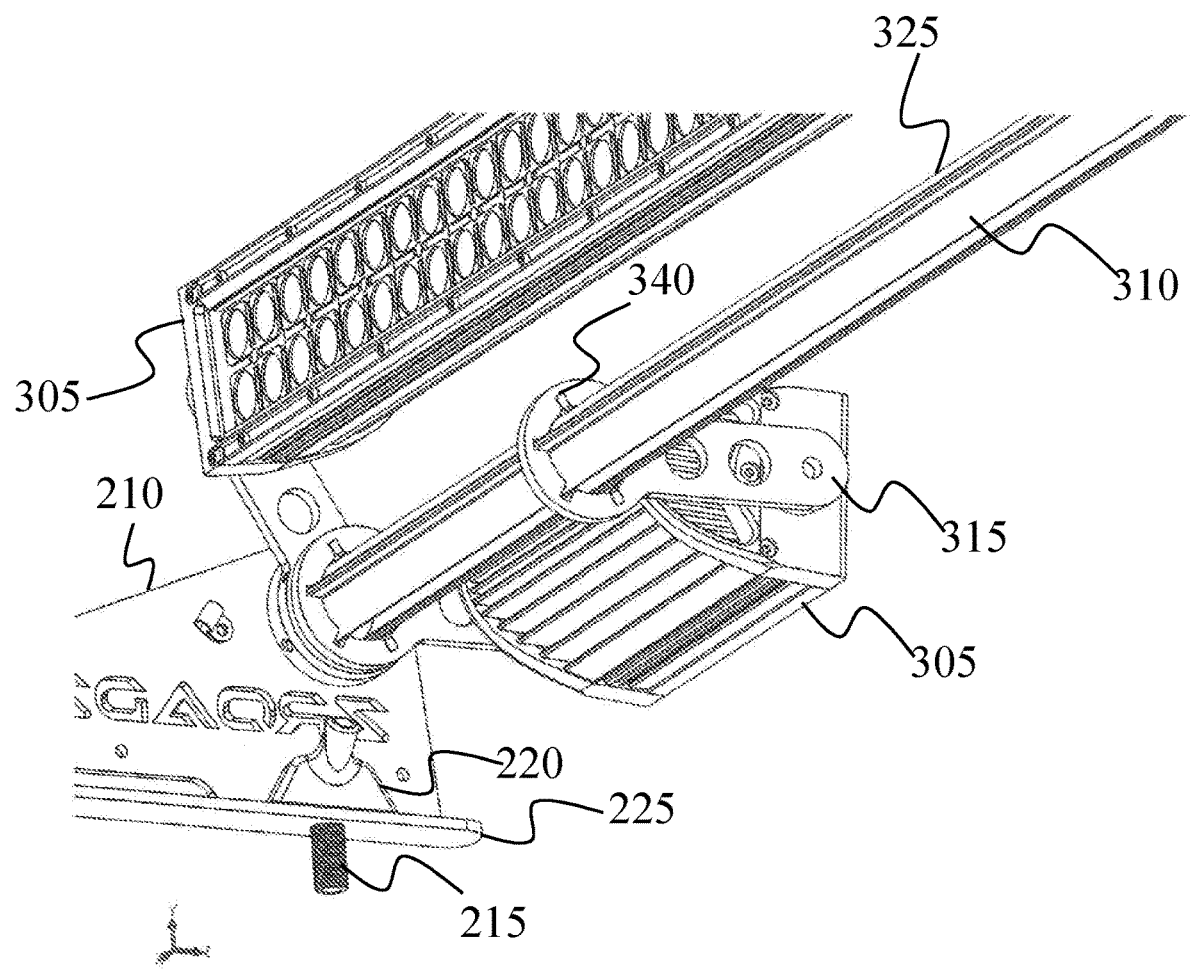
FIG. 15 is an exemplary detailed drawing illustrating an embodiment of the rear light bar assembly of FIG. 14, depicting the mounting bar coupled to the vehicle mounting bracket.

As shown in FIG. 15, a first detent 325 on the mounting bar 310 is a ridge protruding from the circumferential surface of the mounting bar 310. In this embodiment, the second detent 340 on the light bar bracket 315 is one of a series of channels 340 formed at selected positions around the recess of the light bar bracket 315. In some embodiments, an angular distance between the adjacent channels 340 is equal. In some embodiments, the channels 340 are at varying angular distances apart. In one embodiment, the first detent 325 engages with the second detent 340. A recessed screw on the light bracket 315 can be used to secure the bracket 315 to the mounting bar 310.

The plurality of detents 320 on the light bar bracket 315 allows the light 305 to be disposed at one of selected angles around the mounting bar 310 as the first detent 325 cooperates with the second detent 340 on the light mounting bracket 315. In some embodiments, the plurality of detents 320 allow for disposing a light to be facing the front of the vehicle 102 and a light to face the rear of the vehicle 102. In some embodiments, all lights can be facing in one direction but at different angles with respect to the roof of the vehicle 102. For example, if on a truck a light can be disposed to illuminate the truck bed and/or a light can illuminate a region behind the truck. In some embodiments, a light can illuminate a different region in front, behind, or on either side the vehicle 102 based on the angle of light mount.

In an embodiment of a four light configuration shown in FIG. 10, each of the two vehicle mounting brackets 210 has two mounting fasteners to secure the rear light assembly 300 to the roof of a vehicle 102. In the four light configuration, each of the mounting fasteners 215 (shown in FIG. 15) can define a hollow passage for receiving the light cable 240 (shown in FIG. 8) through the mounting fastener 215 into the passenger compartment. A boot 220 covers each of the mounting fasteners 215 to prevent water intrusion into the passenger compartment of the vehicle.

Figure 11:
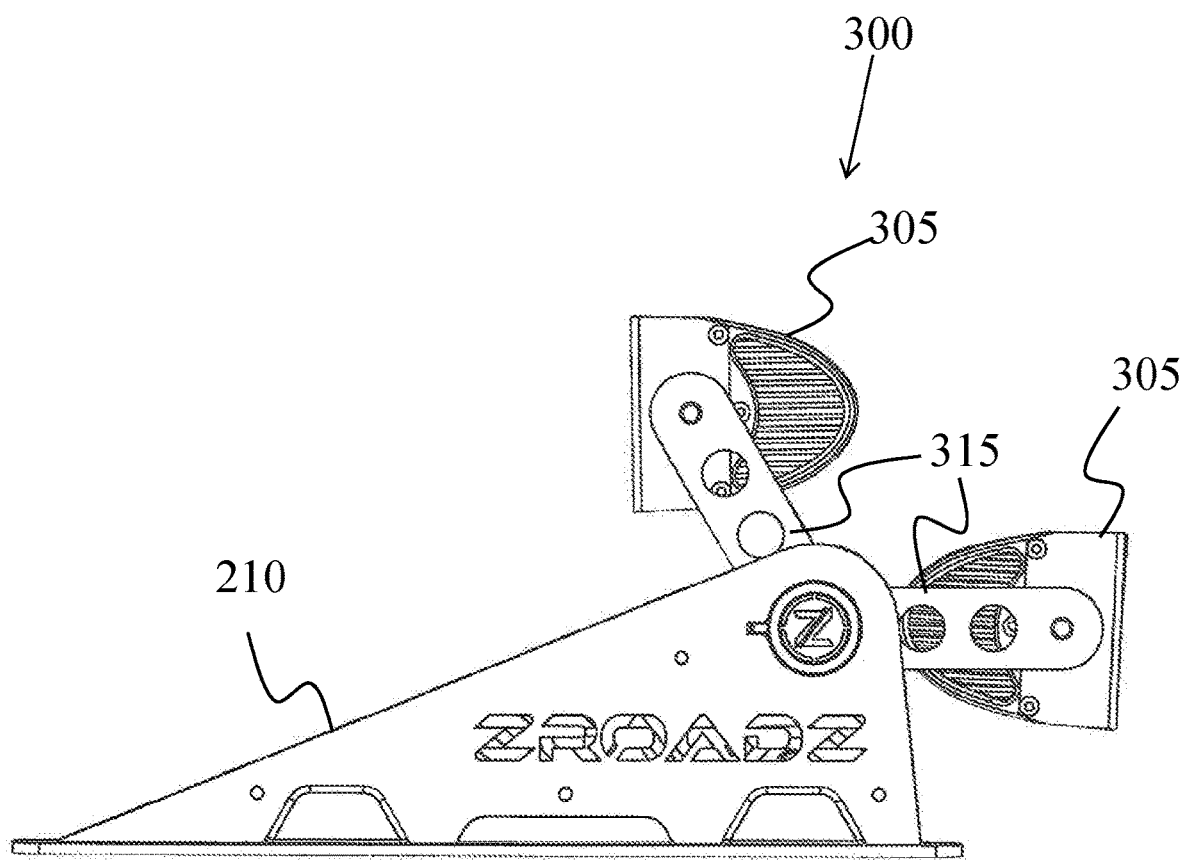
FIG. 11 is an exemplary drawing illustrating an alternative embodiment of the rear light mounting assembly of FIG. 1, wherein two lights are installed at the rear light mounting assembly.

FIG. 11 illustrates a view of a rear light mounting assembly 300 configured with only two lights 305 installed. Each of the lights 305 can be coupled to the mounting bar 310 via a respective light bracket 315. The detents 320 (shown in FIG. 15) on the light bar bracket 315 allow for coupling the light 305 at a predetermined angles with respect to the roof of the vehicle 102. Both lights 305, for example, can be oriented in the same direction at the same angle, in the same direction at different angles from each other, and/or in different directions. For multiple light configurations, the light power cable 240 (shown in FIG. 8) can be routed from the light through a channel in the mounting bar 310 (shown in FIG. 10) to through the passage through the boot 220 (shown in FIG. 7) through the mounting fastener 215 (shown in FIG. 7) into the passenger compartment in the vehicle 102.

Figure 12:
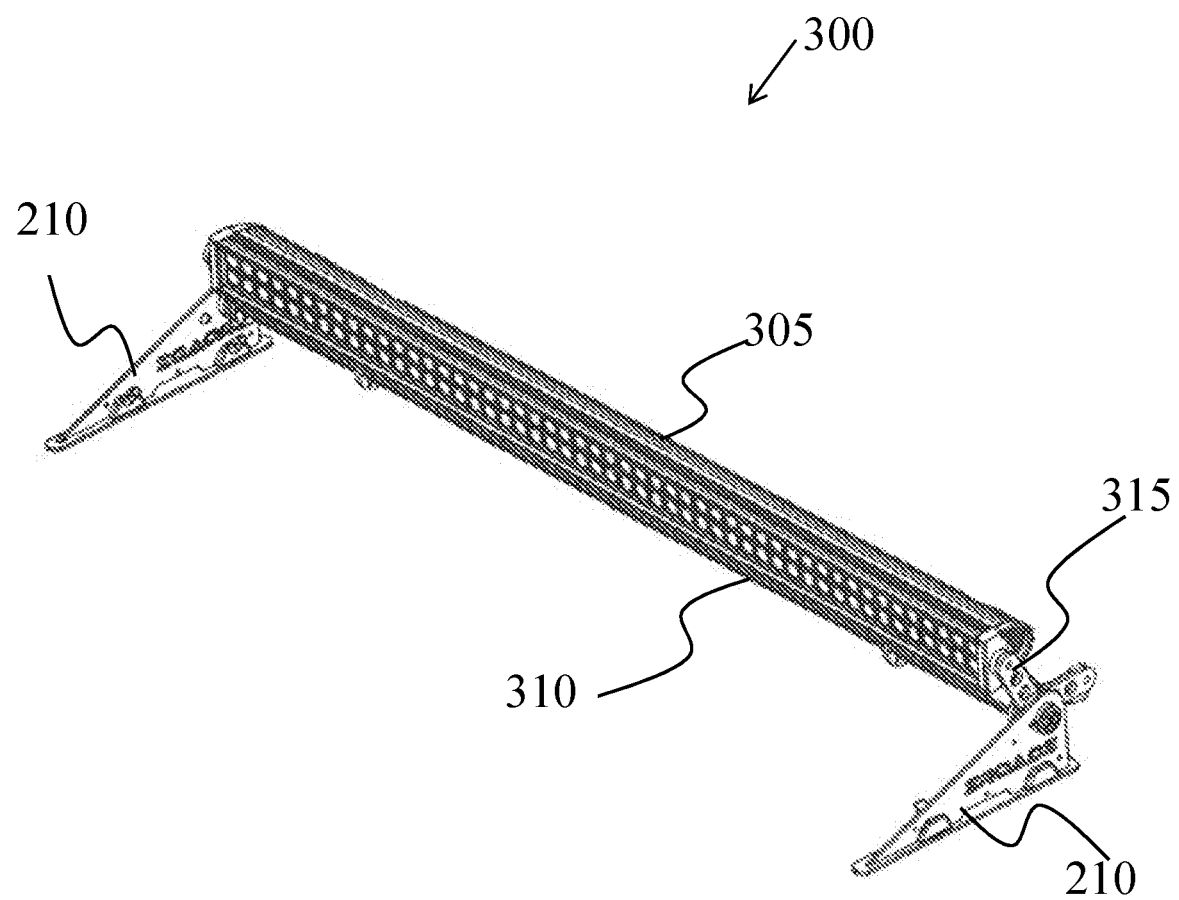
FIG. 12 is an exemplary drawing illustrating another alternative embodiment of the rear light mounting assembly of FIG. 1, wherein one light bar is installed at the rear light mounting assembly.

FIG. 12 illustrates a view of a rear light mounting assembly 300 with one light bar 205 installed. The light bar 305 can be coupled to the vehicle mounting brackets 210 via the light mounting brackets 315. The light bar 305 can be coupled with light mounting bracket 315 via a plurality of fasteners. The light bar 305 can comprise a curved or a straight light bar. The light cable 240 (shown in FIG. 8) for the light bar 305 can be routed through the boot 220 (shown in FIG. 7) and a mounting fastener 215 (shown in FIG. 7) into the interior of the vehicle 102. The second detent (shown in FIG. 15) in the light mounting bracket 315 and the mounting bar 310 allow the light bar 205 to be disposed at selected angles with respect to the roof of the vehicle 102. In some configurations, the light bar 305 can be facing the front of the vehicle 102. In some configurations, the light bar 205 can face the rear of the vehicle 102. The angle of the light bar 305 can also be adjusted to allow for illumination of different regions in front or behind the vehicle 102.

Figure 13:
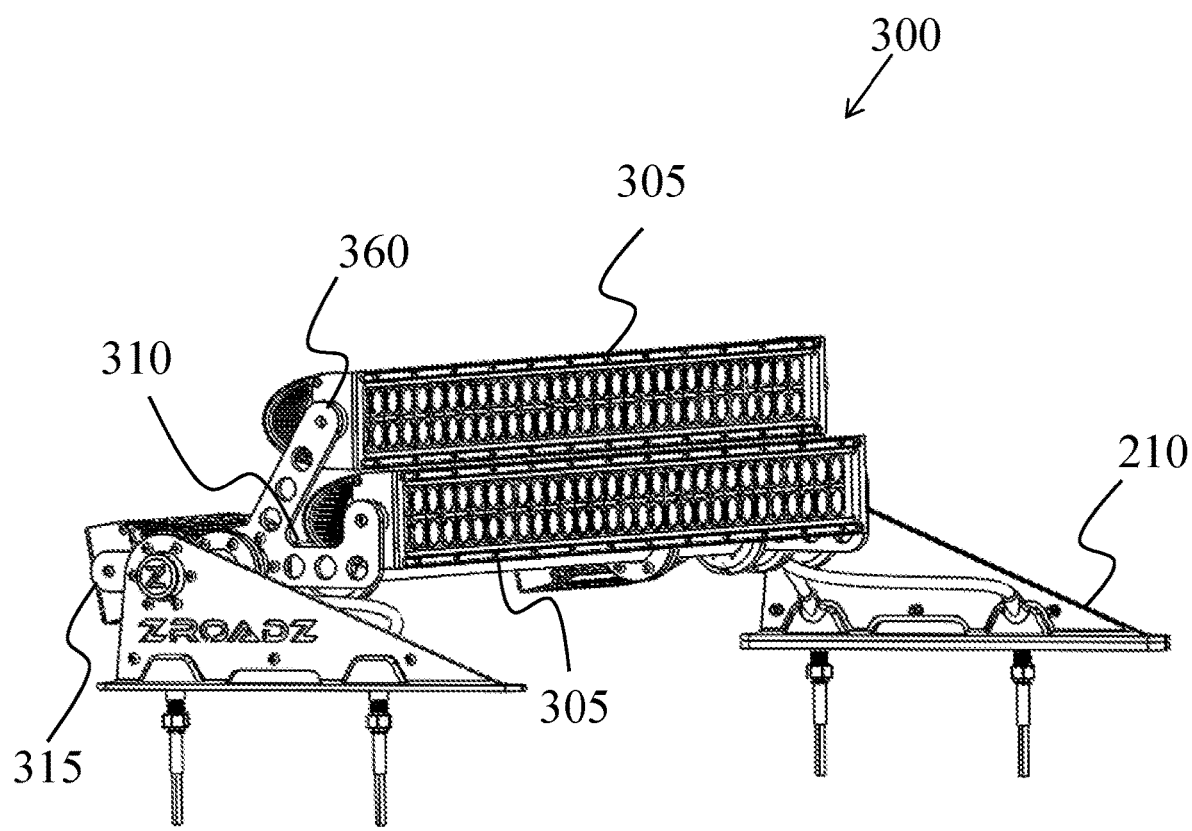
FIG. 13 is an exemplary drawing illustrating one embodiment of the rear light mounting assembly of FIG. 1, depicting dual light bar brackets installed.

FIG. 13 illustrates a view of an embodiment of a rear light mounting assembly 300 configured with dual light bar brackets 360 installed. In some embodiments, a dual light mounting bracket 360 can be coupled to the mounting bar 310. In this embodiment, the dual light bracket 360 comprises a bar with a plurality of extensions extending from a coupling region. In some embodiments, the proximal end of the extensions protrude from the coupling region and form an angle between the extensions. In some embodiments, the angle can be an acute angle, a right angle or an obtuse angle. The coupling region can form a recess through which the mounting bar 310 can be received. The coupling region can have a plurality of detents in communication with the recess for allowing the dual bar 360 to be coupled at any one of a plurality of selected angles, as desired. In one embodiment, the dual light bar bracket 360 can have a plurality of light bars 310 installed, one at the distal end of each extension.

Figure 14:
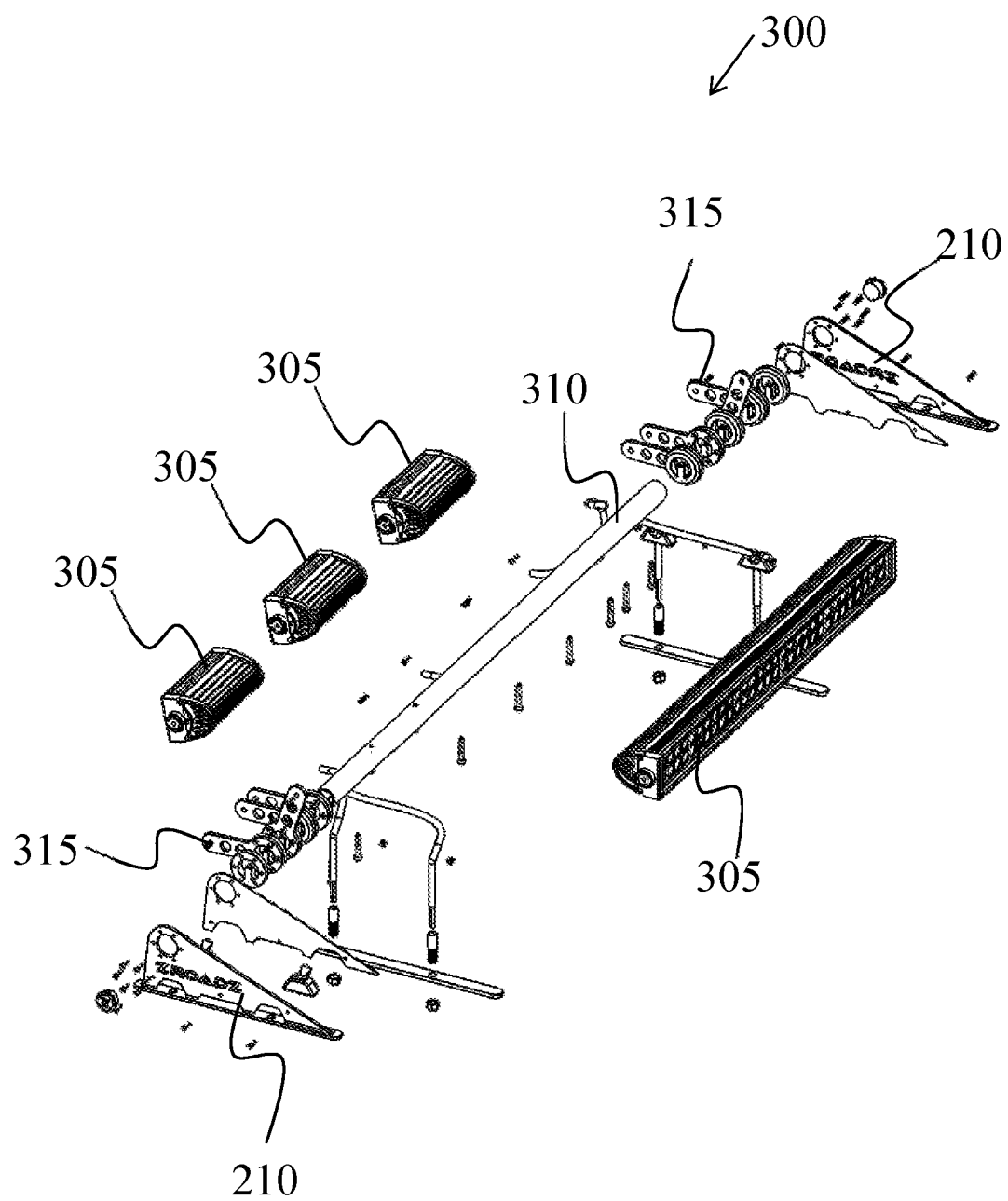
FIG. 14 is an exemplary detailed drawing illustrating an alternative embodiment of the rear light bar assembly of FIG. 10.

FIG. 14 illustrates an exploded view of an embodiment of the rear light mounting assembly 300 of FIG. 10. As shown in FIG. 14, the rear light mounting assembly 300 can comprise a mounting bar 310, a plurality of vehicle mounting brackets 210, a plurality of mounting fasteners 215, and at least one boot 220. The rear mounting assembly 300 can be configured to accept four lights at various angles. The angles can be uniform or different. In order to couple a light 305 to the bar 310, the mounting bar 310 can be disposed through a recess formed in a plurality of light mounting brackets 315. The light mounting brackets 315 can include recessed fasteners to secure the bracket 315 to the mounting bar. The vehicle mounting bracket 210 can include a recess 242 for receiving the mounting bar 310. The rear light mounting assembly has a coupler inserted into the recess 242 to receive the mounting bar 310. The coupler can include a detent to cooperate with the first detent 325 on the mounting bar. The coupler also includes recessed fasteners for securing the mounting bar 310 to the vehicle mounting bracket 210.

FIG. 15 illustrates a detailed view of an embodiment of the rear light mounting assembly mounting bracket 210 depicting the mounting bar 310 coupled to the vehicle mounting assembly 300.

Figure 16:
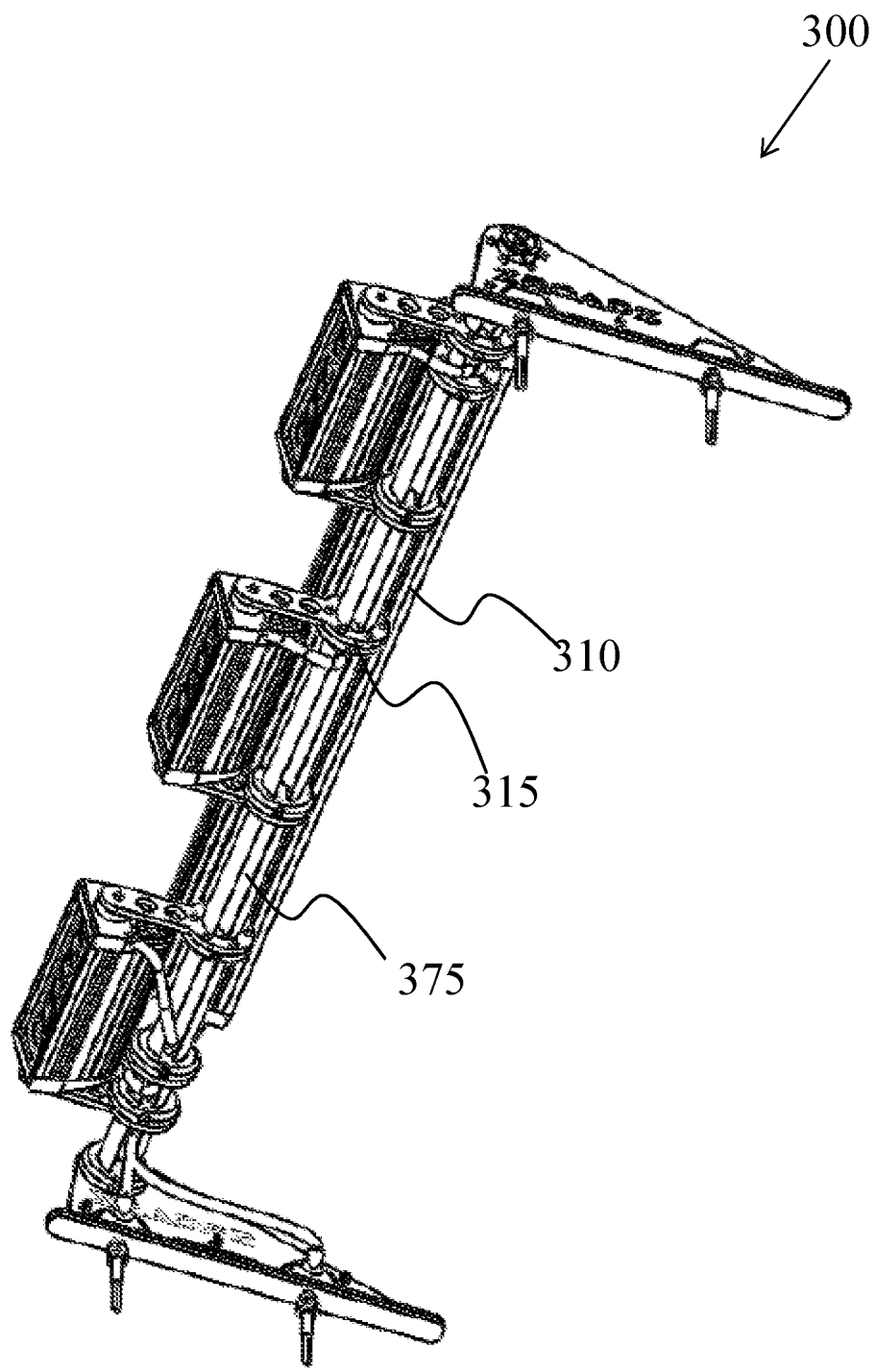
FIG. 16 is an exemplary detailed drawing illustrating an embodiment of the rear light bar assembly of FIG. 14, depicting an exposed cable channel in the mounting bar.

FIG. 16 illustrates a bottom view of the mounting bar 310 and exposed cable channel 375. In some embodiments, the mounting bar 310 can form an internal channel constructed from a hollow metal such as rolled steel. In some embodiments, the internal channel can comprise an axial cable channel 375 along a length of the mounting bar 310. In some embodiments, the mounting bar 310 can include one or more sleeve inserts in the interior of the mounting bar 310 for increasing strength of the mounting bar 310. In some embodiments, the cable channel has a seal 380 (not shown), which covers at least a portion of the cable channel 375.

Figure 17:
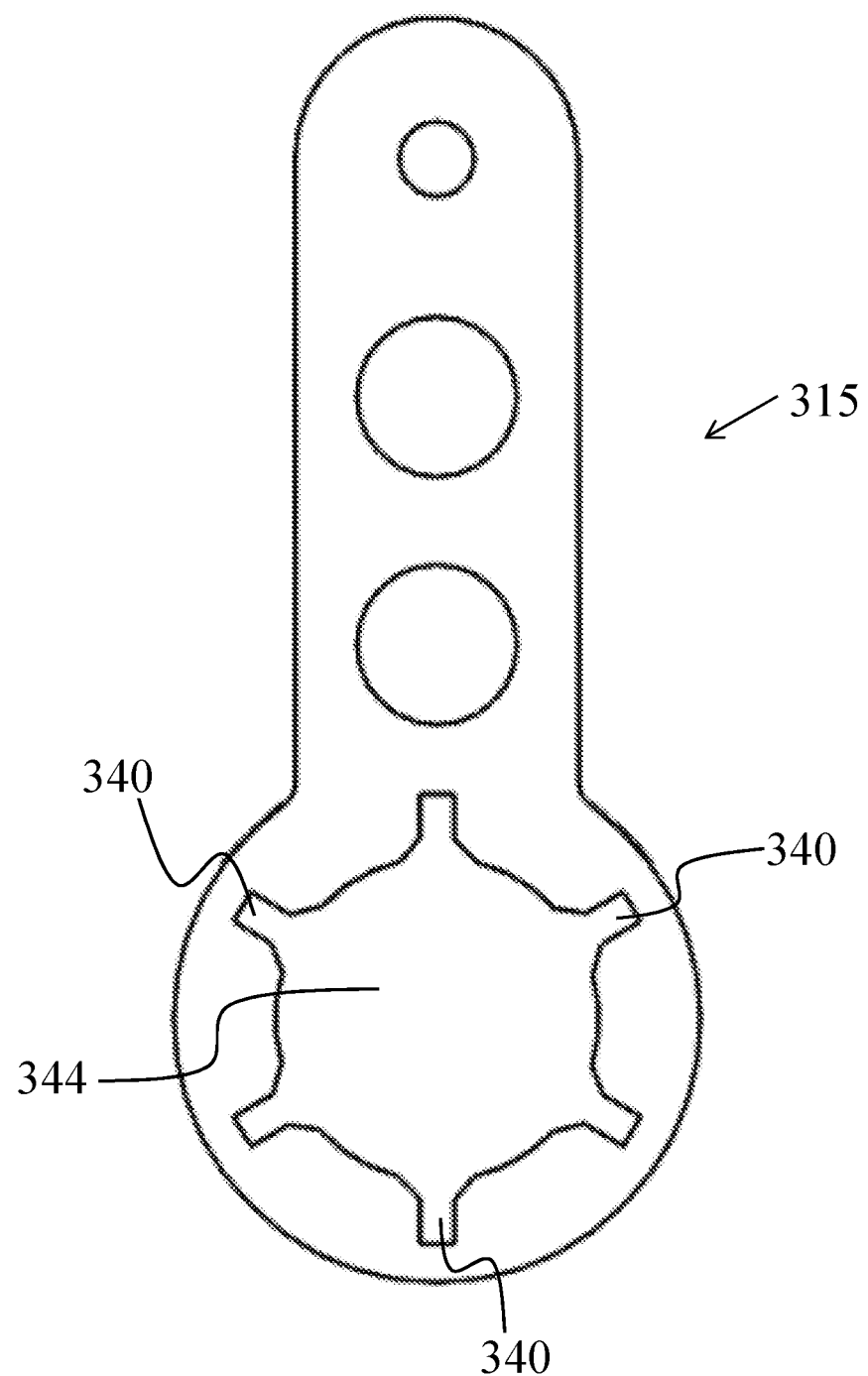
FIG. 17 is an exemplary detailed drawing illustrating an embodiment of a stand-alone view of a single light mounting bracket for the rear light mounting assembly of FIG. 14.

FIG. 17 illustrates a stand-alone view of an embodiment of a single light mounting bracket 315 for the rear light mounting assembly. The light mounting bracket 315 can be formed as a cast metal or fabricated in any commonly accepted manner. In one embodiment, a proximal end of the light mounting bracket 315 forms a recess 344 configured to accept the mounting bar 310 (shown in FIG. 15). In one embodiment, a plurality of detents 340 are formed in structure in communication with the recess 344. These detents 340 can cooperate with the detent formed on the mounting bar 310. While six detents 340 are depicted on the light mounting bracket 315 in FIG. 17, any number of detents 340 can be formed. While FIG. 17 illustrates that the spacing between the detents 340 is uniform, the spacing can also be non-uniform as desired. The distal end of the light mounting bracket 315 also forms a recess to couple the light mounting bracket 315 to the light 305. While FIG. 17 illustrates the detents 340 as being channels for receiving the detent 325 on the mounting bar 310, the detents 340 could alternatively comprise extensions instead of channels.

Figure 18:
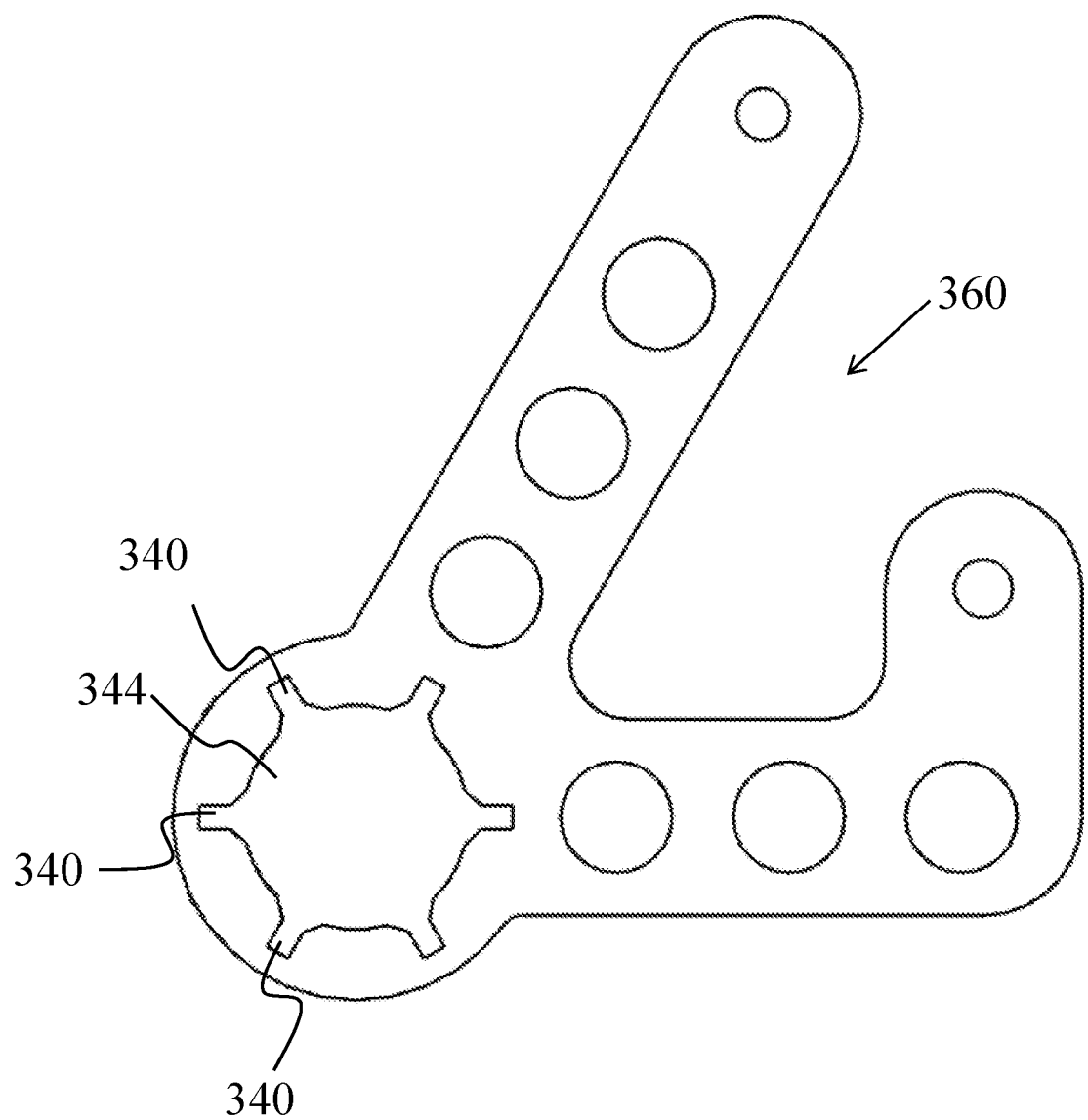
FIG. 18 is an exemplary detailed drawing illustrating a stand-alone view of a dual light mounting bracket for a rear light mounting assembly of FIG. 14.

FIG. 18 illustrates a stand-alone view of an embodiment of a dual light mounting bracket 360 for the rear light mounting assembly 300. The dual light mounting bracket 360 can be formed as a cast metal or fabricated in any commonly accepted manner. In one embodiment, a proximal end of the light mounting bracket 360 forms a recess 344 configured to receive the mounting bar 310 (shown in FIG. 15). In one embodiment, a plurality of detents 340 are formed around the inside circumference of the recess. These detents 340 can cooperate with the detent formed on the mounting bar 310. While six detents 340 are depicted on the light mounting bracket 315 in FIG. 18, any number of detents 340 can be formed. While FIG. 18 illustrates that the spacing between the detents 340 is constant, the spacing can also be varied as required.

The dual light mounting bracket comprises two extensions from the recess. The proximal end of each extension forms the recess 344. A recess is formed at the end of each extension to accommodate mounting to a light bar 310. While FIG. 18 illustrates the detents 340 as being channels configured for receiving the detent 325 on the mounting bar 310, the detents 340 could alternatively comprise extensions instead of channels.

Figure 19A:
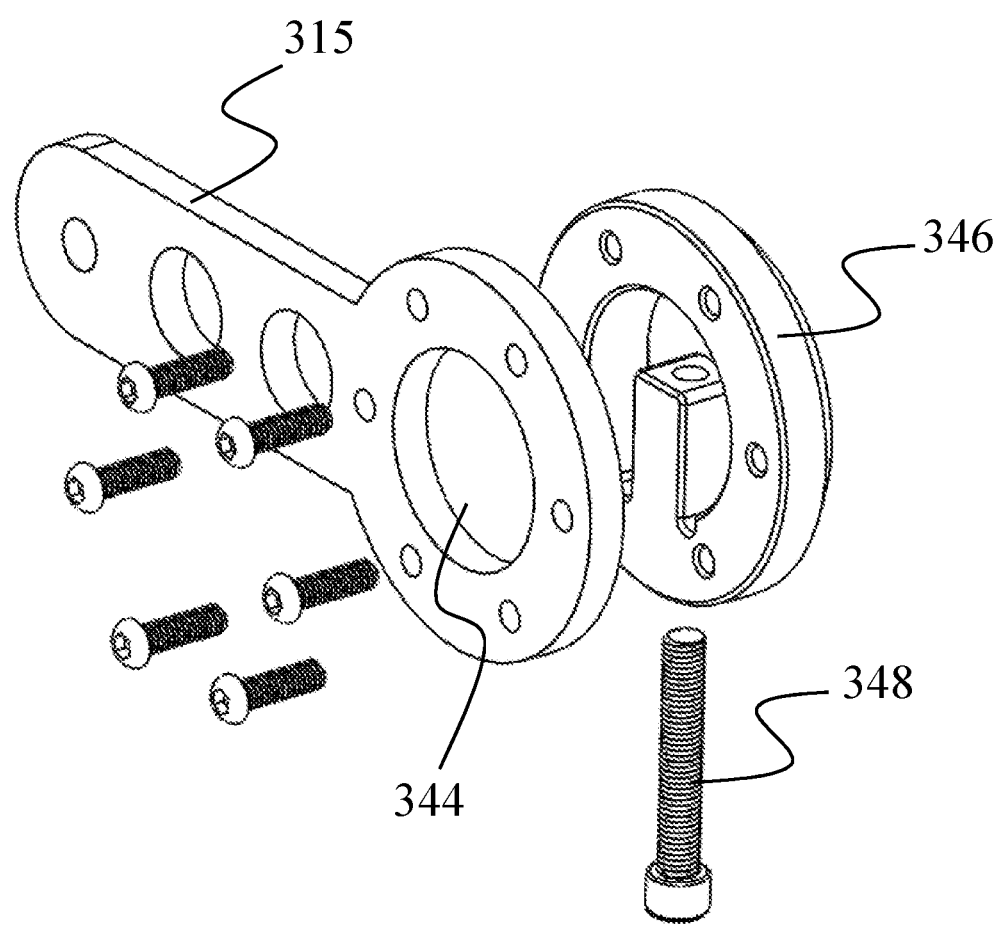
FIG. 19A is an exemplary detailed drawing illustrating another embodiment of a stand-alone view of a single light mounting bracket for the rear light mounting assembly of FIG. 14.

FIG. 19A illustrates an exploded view of an embodiment of a single light mounting bracket 315 for the rear light mounting assembly 300. The light mounting bracket 315 can be formed as a cast metal or fabricated in any commonly accepted manner. In one embodiment, a proximal end of the light mounting bracket 315 forms a recess 344 configured to accept the mounting bar 310 (shown in FIG. 15). In one embodiment, a mounting attachment 346 is coupled with the single light mounting bracket 315. The mounting attachment 346 can be a circular in shape with an extension detent projecting towards the center of the recess 344 when coupled. The extension can be configured to fit within the channel 375 of the mounting bar 310.

Figure 19B:
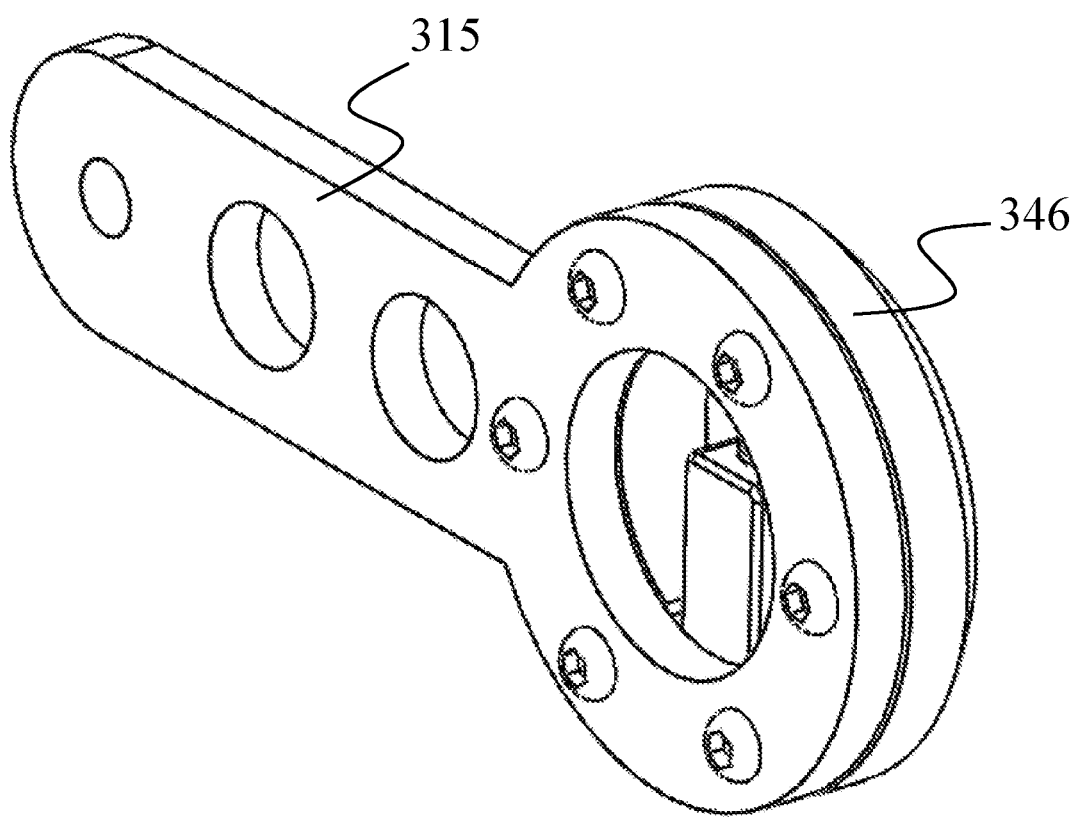
FIG. 19B is an exemplary detailed drawing illustrating another embodiment of a stand-alone view of a single light mounting bracket for the rear light mounting assembly of FIG. 14.

FIG. 19B illustrates a view of an embodiment of a single light mounting bracket 315 for the rear light mounting assembly 300. FIG. 19B depicts the mounting attachment 346 coupled with the light mounting bracket 315 with a plurality of fasteners. Although FIG. 19B depicts 6 fasteners, any suitable number of fasteners can be used to couple to mounting attachment 346 to the mounting bracket 315.

Figure 19C:
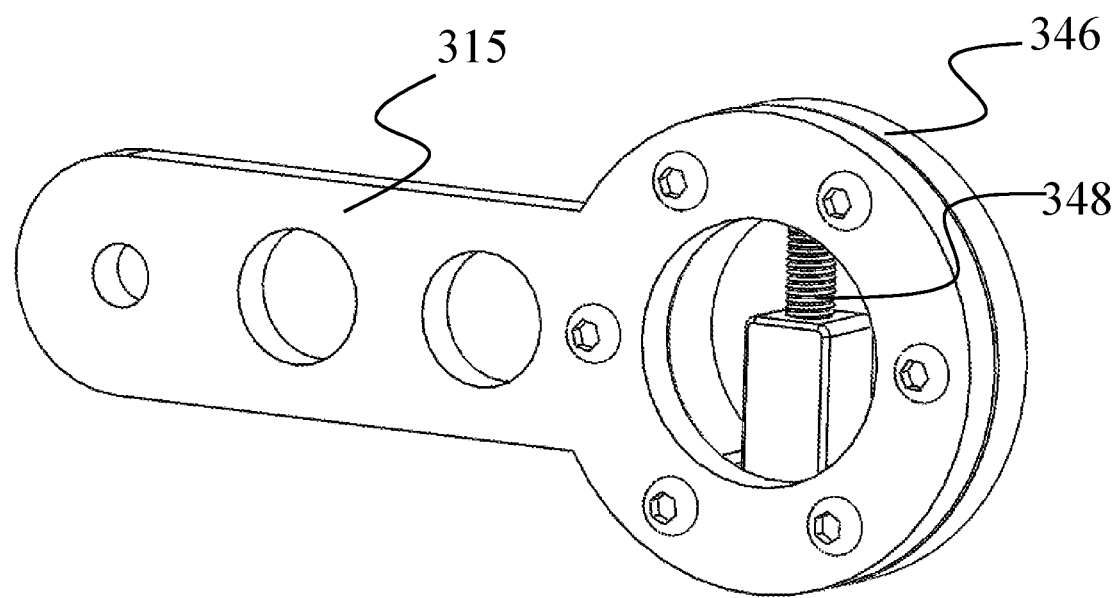
FIG. 19C is an exemplary detailed drawing illustrating another embodiment of a stand-alone view of a single light mounting bracket for the rear light mounting assembly of FIG. 14.

FIG. 19C illustrates a view of an embodiment of a single light mounting bracket 315 for the rear light mounting assembly 300. FIG. 19C depicts the mounting attachment 346 coupled with the light mounting bracket 315 with a plurality of fasteners. FIG. 19C also illustrates a mounting fastener 348 protruding from the extension of the mounting attachment. The extension can have a recess adapted to receive a fastener 348. The fastener 348 can extend, tightening against the bar 310 when installed (shown in FIG. 16). The recess inside the extension can be threated to cooperate with a threated fastener 348.

Figure 20A:
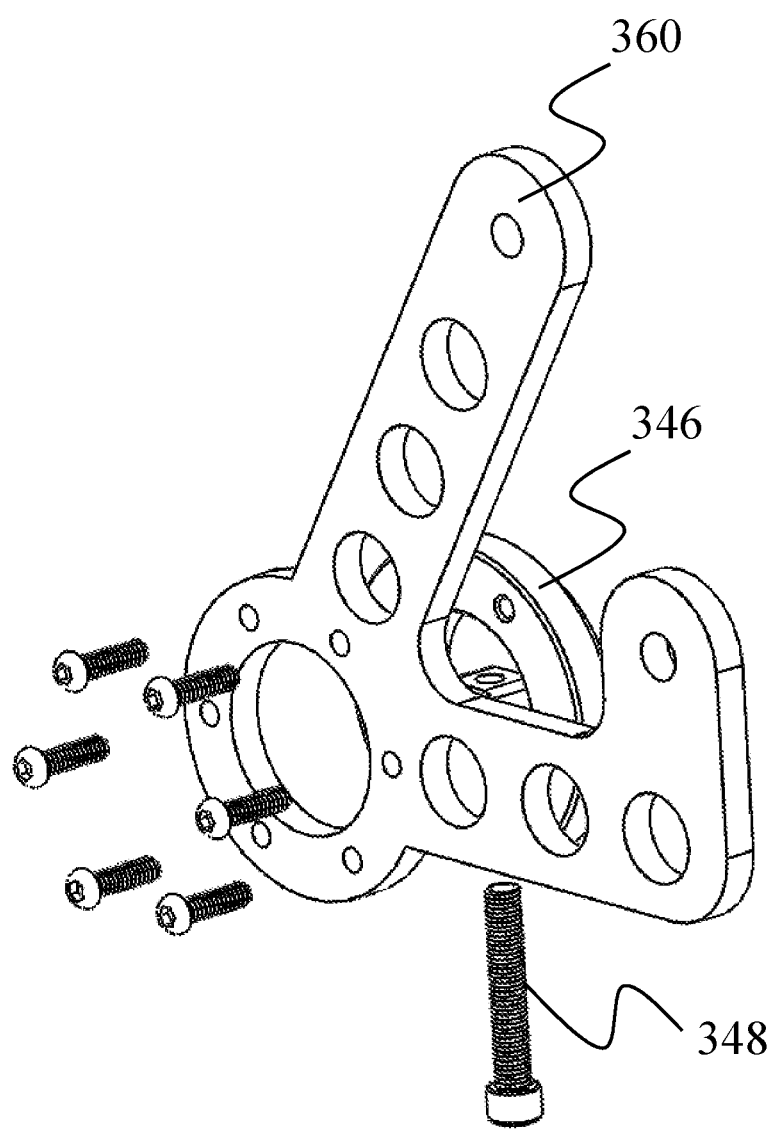
FIG. 20A is an exemplary detailed drawing illustrating another stand-alone view of a dual light mounting bracket for a rear light mounting assembly of FIG. 14.

FIG. 20A illustrates a stand-alone view of another embodiment of a dual light mounting bracket 360 for the rear light mounting assembly 300. The dual light mounting bracket 360 can be formed as a cast metal or fabricated in any commonly accepted manner. In one embodiment, a proximal end of the light mounting bracket 315 forms a recess 344 configured to accept the mounting bar 310 (shown in FIG. 16). In one embodiment, a mounting attachment 346 is coupled with the single light mounting bracket 315. The mounting attachment 346 can be a circular in shape with an extension detent projecting towards the center of the recess 344 when coupled. The extension can be configured to fit within the channel 375 of the mounting bar 310.

Figure 20B:
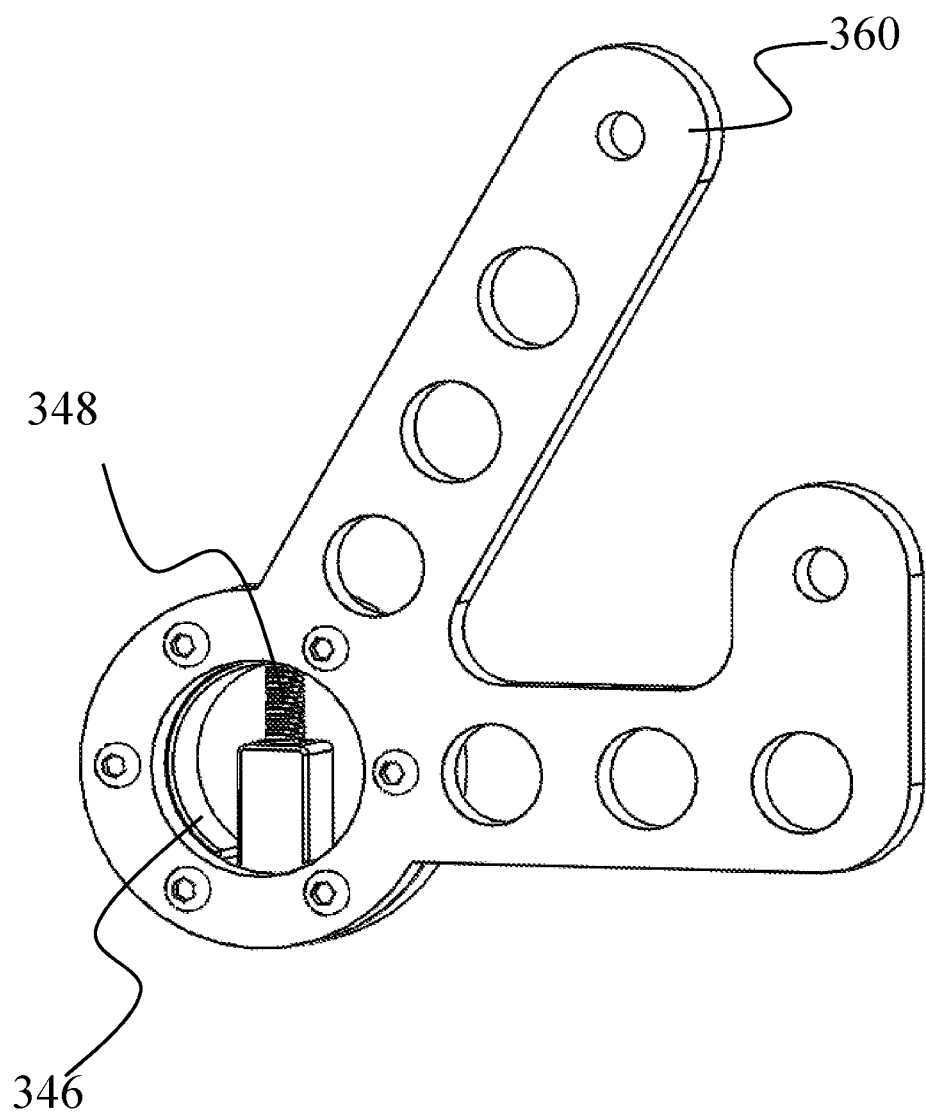
FIG. 20B is an exemplary detailed drawing illustrating another stand-alone view of a dual light mounting bracket for a rear light mounting assembly of FIG. 14.

FIG. 20B illustrates a stand-alone view of another embodiment of a dual light mounting bracket 360 for the rear light mounting assembly 300. FIG. 20B depicts the mounting attachment 346 coupled with the dual light mounting bracket 360 with a plurality of fasteners. Although FIG. 20B depicts 6 fasteners, any suitable number of fasteners can be used to couple to mounting attachment 346 to the dual light mounting bracket 360. FIG. 20B also illustrates a mounting fastener 348 protruding from the extension of the mounting attachment. The extension can have a recess adapted to receive a fastener 348. The fastener 348 can extend, tightening against the bar 310 when installed (shown in FIG. 16). The recess inside the extension can be threated to cooperate with a threated fastener 348.

FIG. 21 illustrates an exemplary top-level diagram of a method 400 for mounting a light to a vehicle. In one embodiment, the method 400 comprises disposing, at 405, a mounting bar for coupling with the vehicle at least partially into an opening formed in a bracket for coupling with the light, wherein a first detent associated with the mounting bar cooperates with a second detent of the mounting bracket. In disposing, at 405, the mounting bar, the mounting bar can be slid through a recess in the bracket. The detents allow the bracket to be mounted at a position selected from different positions relative to the mounting bar.

As shown in FIG. 22, the method 400 can further comprise coupling, at 410, the vehicle mount to an end region of the mounting bar. A vehicle bracket can be coupled at each of a proximal and a distal end region of the mounting bar. The vehicle bracket and mounting bar can be coupled through any traditional means to include mounting fasteners such as bolts, screws, rivets etc. In one embodiment the coupling can occur when a plurality of set screws around the enclosure are tightened around the mounting bar after the mounting bar is at least partially disposed into the recess on the mounting bar.

The method 400 is shown as optionally comprising coupling, at 415, a vehicle mount to the vehicle using a mounting fastener, wherein the mounting fastener defines a hollow passage for routing an electrical power cable of the light. The coupling, at 415, can include any number of mounting fasteners to secure the vehicle mount to the vehicle. Optionally, the vehicle mount can be coupled in the gutter of the roof. Where multiple lights are used, multiple mounting fasteners with hollow passages can be used for routing the light cables into the passenger compartment.

In another embodiment, the method 400 further comprises encasing, at 420, the mounting fastener in a protective boot. The boot helps route the light cable into the mounting fastener into the passenger compartment of the vehicle. Optionally where no hollow fastener is used for coupling the mount, a protective boot can be omitted.

In another embodiment, the method 400 further comprises routing, at 425, routing a cable of the light through a hollow passage formed in the mounting bar. Routing, at 425, the power cable saves forming an additional hole in the roof of the vehicle and reduces risk of water intrusion.

In another embodiment, the method 400 further comprises coupling, at 430, a diffuser on the light. Coupling, at 430, can be accomplished using a plurality of fasteners. Optionally, coupling, at 430, can be accomplished by an adhesive. Optionally, the diffuser can be formed as part of the housing of the light.

FIG. 22 illustrates an exemplary top-level diagram of a method 500 for manufacturing a vehicle light mounting assembly. The method 500 of FIG. 22 is shown to include forming, at 505, a bracket for coupling with a light; defining, at 510, an opening for receiving a mounting bar for coupling with a vehicle. The bracket with a first detent can be formed, at 515, for cooperating with a second detent of the mounting bracket.

The method 500 is shown as optionally comprising forming, at 520, a vehicle mount for coupling to an end region of the mounting bar.

The method 500 is shown as optionally comprising forming, at 525, a mounting fastener defining a hollow passage for routing a cable of the light.

The method 500 is shown as optionally comprising forming, at 530, a boot for encasing the mounting fastener.

The method 500 is shown as optionally comprising forming, at 535, a hollow passage in the mounting bar for routing the cable for the light.

The method 500 is shown as optionally comprising forming, at 540, a second bracket for coupling with a second light; and providing the bracket with a first detent for cooperating with the second detent of the mounting bracket.

The method 500 is shown as optionally comprising forming, at 545, a diffuser for coupling on the light.

The disclosed embodiments are susceptible to various modifications and alternative forms, and specific examples thereof have been shown by way of example in the drawings and herein described in detail. It should be understood, however, that the disclosed embodiments are not meant to be limited to the particular forms or methods disclosed, but to the contrary, the disclosed embodiments are to cover all modifications, equivalents, and alternatives.

What is claimed is:

1. An apparatus for mounting a light assembly on a roof of a vehicle, the light assembly having a plurality of individual LED light sources arranged within a housing having opposite end regions with respective first and second vehicle mounting brackets and from which a power cable for the light sources extends, comprising:
   a first bracket body including a first mounting region for cooperating with the first mounting bracket of the light assembly and a first flange being normal to the first bracket body and opposite said first mounting region, said first flange conforming with a contour of the vehicle roof at a first predetermined mounting location and defining a first opening for receiving a first mounting fastener for securing said first bracket body with the first predetermined mounting location, the first mounting fastener defining a central channel for receiving the power cable of the light assembly;
   a second bracket body including a second mounting region for cooperating with the second mounting bracket of the light assembly and a second flange being normal to the second bracket body and opposite said second mounting region, said second flange conforming with a contour of the vehicle roof at a second predetermined mounting location and defining a second opening for receiving a second mounting fastener for securing said second bracket body with the second predetermined mounting location; and
   a boot defining an internal chamber for receiving the first mounting fastener, respectively, and forming a weather-resistant seal around the respective fastener.

2. The apparatus of claim 1, wherein said first mounting region directly couples with the first mounting bracket of the light assembly, and wherein said second mounting region directly couples with the second mounting bracket of the light assembly.

3. The apparatus of claim 1, further comprising:
   a mounting bar having a preselected length being less than a width of the vehicle roof and opposite end regions for coupling with said first and second mounting regions, respectively, said mounting bar defining a central channel for receiving the power cable of the light assembly and including at least one first detent along the length of said mounting bar;
   a first bracket including a first mounting region for cooperating with the first mounting bracket of the light assembly and a second mounting region opposite said first mounting region and defining a first opening for receiving said mounting bar and having a second detent for cooperating with a selected first detent; and
   a second bracket including a first mounting region for cooperating with the second mounting bracket of the light assembly and a second mounting region opposite said first mounting region of said second bracket and defining a second opening for receiving said mounting bar and having a second detent for cooperating with the selected first detent.

4. The apparatus of claim 3, further comprising a plurality of mounting bars.

5. The apparatus of claim 1, further comprising a diffuser coupled with the housing of the light for reducing noise or vibration.

* * * * *